United States Patent
Inukai et al.

(10) Patent No.: US 11,922,836 B2
(45) Date of Patent: Mar. 5, 2024

(54) RENDERING SYSTEM, DISPLAY SYSTEM, DISPLAY CONTROL SYSTEM, AND RENDERING METHOD

(71) Applicant: Panasonic Intellectual Property Management Co., Ltd., Osaka (JP)

(72) Inventors: Fumihito Inukai, Kyoto (JP); Toshiya Mori, Osaka (JP); Masanaga Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 17/707,489

(22) Filed: Mar. 29, 2022

(65) Prior Publication Data

US 2022/0319366 A1    Oct. 6, 2022

(30) Foreign Application Priority Data

Mar. 29, 2021 (JP) ................................ 2021-056318
Mar. 18, 2022 (JP) ................................ 2022-044651

(51) Int. Cl.
G09G 3/00         (2006.01)

(52) U.S. Cl.
CPC ..... *G09G 3/002* (2013.01); *G09G 2340/0464* (2013.01); *G09G 2380/10* (2013.01)

(58) Field of Classification Search
CPC ... G09G 5/38; G06T 7/269; B60K 2370/1529
See application file for complete search history.

(56) References Cited

U.S. PATENT DOCUMENTS

| | | |
|---|---|---|
| 2016/0216521 A1* | 7/2016 | Yachida .................... B60R 1/00 |
| 2019/0025580 A1* | 1/2019 | Nagano ................ H04N 9/3194 |
| 2020/0012097 A1* | 1/2020 | Kubota .................... G08G 1/16 |
| 2020/0218979 A1* | 7/2020 | Kwon ................... B60W 30/14 |

FOREIGN PATENT DOCUMENTS

| | | |
|---|---|---|
| JP | 6775188 | 10/2020 |
| JP | 2021-128471 | 9/2021 |

* cited by examiner

*Primary Examiner* — Samantha (Yuehan) Wang
(74) *Attorney, Agent, or Firm* — Greenblum & Bernstein, P.L.C.

(57) ABSTRACT

A rendering system includes a first obtainer, a second obtainer, a renderer, an estimator, and a corrector. The first obtainer obtains position information indicating a position of an object from a detector. The second obtainer obtains movement information indicating a movement state of the moving body. The renderer renders a display image including a content related to the object. The estimator estimates a delay period by comparing the position information to estimated-position information indicating an estimated position of the object estimated based on the movement information of the object. The corrector corrects displacement of a display position of the content on the display image which is caused by movement of the moving body over the delay period.

20 Claims, 16 Drawing Sheets

RENDERING SYSTEM, DISPLAY SYSTEM, DISPLAY CONTROL SYSTEM, AND RENDERING METHOD

CROSS REFERENCE TO RELATED APPLICATION

The present application is based on and claims priority of Japanese Patent Application No. 2021-056318 filed on Mar. 29, 2021 and Japanese Patent Application No. 2022-044651 filed on Mar. 18, 2022.

FIELD

The present disclosure relates to a rendering system, a display system, a display control system, and a rendering method for rendering a display image that is projected onto a display medium to be viewed as a virtual image by an occupant of a moving body.

BACKGROUND

PTL 1 discloses a head-up display device that projects a display image onto a display medium to allow an occupant of a moving body to view a virtual image.

CITATION LIST

Patent Literature

PTL1: Japanese Patent No. 6775188

SUMMARY

The present disclosure provides a rendering system and other aspects capable of attaining further improvement.

In accordance with an aspect of the present disclosure, a rendering system includes a first obtainer, a second obtainer, a renderer, an estimator, and a corrector. The first obtainer obtains, from a detector that detects an object in a vicinity of a moving body, position information indicating a position of the object. The second obtainer obtains movement information indicating a movement state of the moving body. The renderer renders a display image including a content related to the object based on the position information and the movement information. The display image is projected on a display medium to be viewed as a virtual image by an occupant of the moving body. The estimator estimates a delay period including a delay by comparing the position information to estimated-position information. The delay is a time period from when the detector detects the object to when the first obtainer obtains the position information. The estimated-position information indicates an estimated position of the object which is estimated based on the movement information of the object. The corrector corrects a displacement of a display position of the content on the display image. The displacement is caused by movement of the moving body over the delay period.

In accordance with another aspect of the present disclosure, a display system includes the above-described rendering system and the projector. The projector projects the display image onto the display medium to be viewed as a virtual image by the occupant of the moving body. The display image is rendered by the rendering system.

In accordance with still another aspect of the present disclosure, a display control system includes a first obtainer, a second obtainer, an estimator, and a corrector. The first obtainer obtains, from a detector that detects an object in a vicinity of a moving body, position information indicating a position of the object. The second obtainer obtains movement information indicating a movement state of the moving body. The estimator estimates a delay period including a delay from when the detector detects the object to when the first obtainer obtains the position information, by comparing the position information to estimated-position information indicating an estimated position of the object which is estimated based on movement information of the moving body. The corrector corrects a displacement of a display position of a content on a display image, the displacement being caused by movement of the moving body over the delay period. Here, the display image is projected on a display medium to allow an occupant of the moving body to view the display image as a virtual image. The projecting is performed based on the position information and the movement information, and the display image includes the content related to the object.

In accordance with still another aspect of the present disclosure, a display control system includes a display controller that controls displaying of a display image. The display image is rendered based on (i) position information that indicates a position of an object in a vicinity of a moving body and is obtained by a detector for detecting the object and (ii) moving information that indicates a movement state of the moving body, the display image being projected onto a display medium to allow an occupant of the moving body to view the display image as a virtual image, the display image including a content related to the object. Here, the display controller controls the displaying of the display image to cause a corrected display image to be projected on the display medium. The corrected display image is the display image in which a displacement of a display position of the content is corrected, the displacement being caused by movement of the moving body over a delay period. The delay period is a period including a delay from when the detector detects the object to when the position information is obtained, the delay being estimated by comparing the position information to estimated-position information indicating an estimated position of the object which is estimated based on movement information of the moving body.

In accordance with still another aspect of the present disclosure, a rendering method includes a first obtaining step, a second obtaining step, a rendering step, an estimating step, and a correcting step. The first obtaining step is a step of obtaining, from a detector that detects an object in a vicinity of a moving body, position information indicating a position of the object. The second obtaining step is a step of obtaining movement information indicating a movement state of the moving body. The rendering step is a step of rendering a display image including a content related to the object based on the position information and the movement information, the display image being projected on a display medium to be viewed as a virtual image by an occupant of the moving body. The estimating step is a step of estimating a delay period including a delay by comparing the position information to estimated-position information, the delay being a time period from when the detecting of the object to when the obtaining of the position information, the estimated-position information indicating an estimated position of the object which is estimated based on the movement information of the object. The correcting step is a step of correcting a displacement of a display position of the content on the display image, the displacement being caused by movement of the moving body over the delay period.

The rendering system and other aspects disclosed herein can attain further improvement.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENTS

Figure 1:
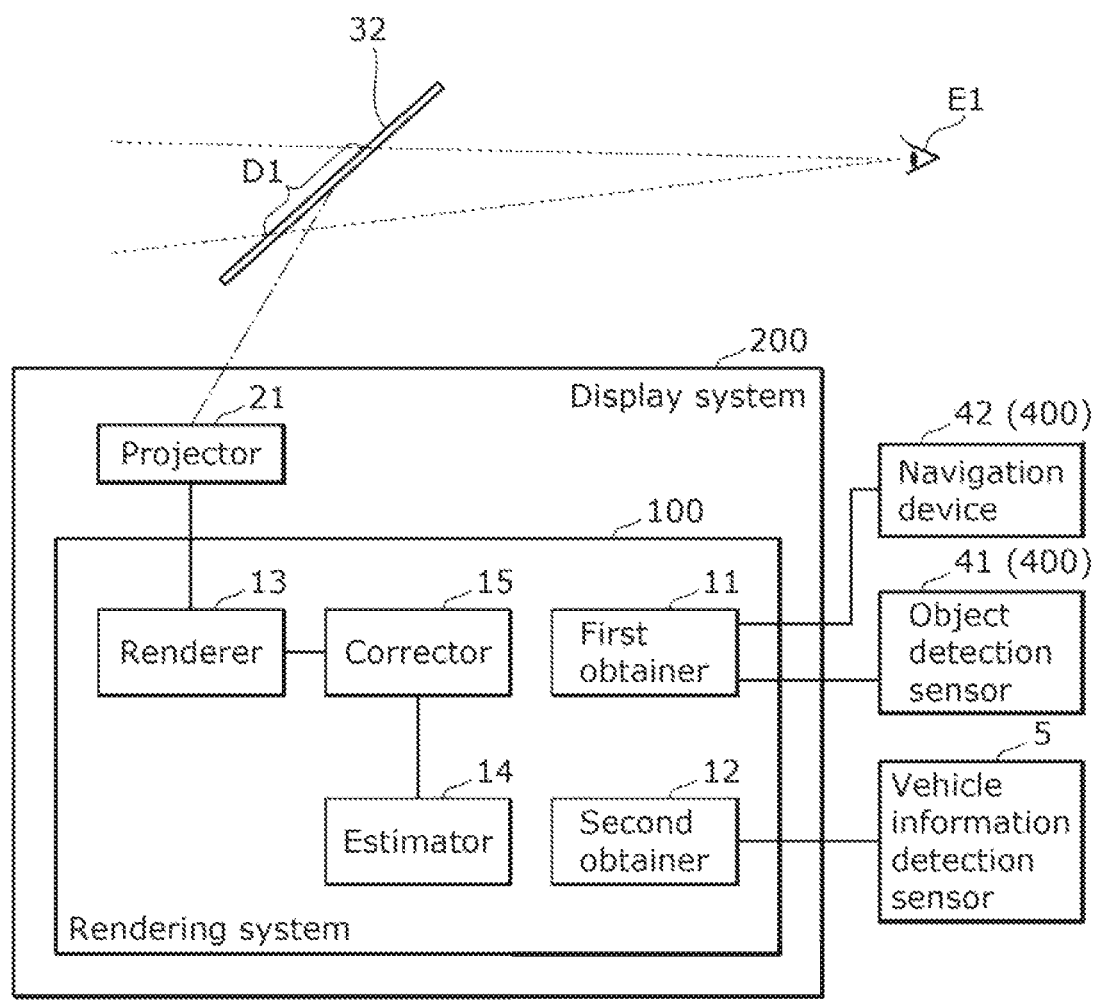
FIG. 1 is a block diagram illustrating an overview of a display system having a rendering system in embodiment 1.

In accordance with an aspect of the present disclosure, a rendering system includes a first obtainer, a second obtainer, a renderer, an estimator, and a corrector. The first obtainer obtains, from a detector that detects an object in a vicinity of a moving body, position information indicating a position of the object. The second obtainer obtains movement information indicating a movement state of the moving body. The renderer renders a display image including a content related to the object based on the position information and the movement information. The display image is projected on a display medium to be viewed as a virtual image by an occupant of the moving body. The estimator estimates a delay period including a delay by comparing the position information to estimated-position information. The delay is a time period from when the detector detects the object to when the first obtainer obtains the position information. The estimated-position information indicates an estimated position of the object which is estimated based on the movement information of the object. The corrector corrects a displacement of a display position of the content on the display image. The displacement is caused by movement of the moving body over the delay period.

According to the above aspect, because the estimator updates the delay period, the accuracy can be advantageously improved in correcting the displacement of the display position of the content related to the object in the display image, compared with a case in which the delay period is a fixed value. In addition, because the estimator updates the delay period, there is no need to preset a delay period specific to the configuration (design) of the display system. This advantageously facilitates designing the display system.

It is possible that the estimator estimates the delay period with reference to a first time stamp and a second time stamp, the first time stamp indicating at least a time period counted by the detector, the second time stamp indicating at least a time period counted by the rendering system.

According to the above, the estimator may calculate the time difference between the first time stamp and the second time stamp only once on activation of the detector and the rendering system, and does not need to repeatedly estimate the delay period during the operation of the display system. This can advantageously reduce the processing load on the estimator.

It is possible that in the estimating of the delay period, the estimator executes disturbance cancellation for cancelling disturbance that influences the delay period.

According to the above, the estimator cancels a disturbance in estimating the delay period. This advantageously facilitates improving the accuracy of estimating the delay period.

It is possible that the disturbance cancellation is processing in which an average value of provisional delay periods calculated for the estimating of the delay period is set to the delay period.

The above advantageously facilitates cancelling a disturbance affecting the delay period, compared with a case in which the delay period is set to the calculated delay period each time it is calculated.

It is possible that the disturbance cancellation is processing in which a result of the estimating is excluded from the delay period, the estimating being executed in a time period where an interval between the first stamps each indicating a time point of detecting the object by the detector is beyond a predetermined range.

According to the above, the result of estimating the delay period is excluded during a time period in which the detector is considered unstable. This advantageously facilitates cancelling a disturbance affecting the delay period.

It is possible that the disturbance cancellation is processing in which a result of the estimating is excluded from the delay period, the estimating being executed in a time period where a displacement amount in an orientation of the moving body is smaller than a predetermined value.

In a time period with little change in the orientation of the moving body, for example when the moving body is running on a straight road, the accuracy of estimating the delay period tends to decrease. According to the above, the result of estimating the delay period is excluded during such a time period. This advantageously facilitates cancelling a disturbance affecting the delay period.

It is possible that the disturbance cancellation is processing in which a result of the estimating is excluded from the delay period, the estimating being executed in a time period where a magnitude of vibration of the moving body is greater than a predetermined magnitude.

In a time period in which the magnitude of vibrations of the moving body is relatively great, the accuracy of estimating the delay period tends to decrease. According to the above, the result of estimating the delay period is excluded during such a time period. This advantageously facilitates cancelling a disturbance affecting the delay period.

It is possible that the corrector corrects the displacement of the display position of the content on the display image after the renderer renders the display image.

According to the above, a delay that may occur in the renderer can be reflected in correcting the displacement of the display position of the content in the display image. This advantageously facilitates improving the accuracy of the correction.

It is possible that data transmitted from the renderer to the corrector includes information resulting from the detection by the detector.

The above advantageously facilitates synchronization between, for example, the position information on the object detected by the detector and the display image rendered by the renderer.

It is possible that the corrector corrects the displacement of the display position of the content on the display image, by shifting the content rendered by the renderer.

The above can advantageously reduce the processing load on the corrector and also reduce a delay caused by processing in the corrector, compared with a case in which the displacement of the display position of the content is corrected by re-rendering the content.

It is possible that the delay period includes a first delay period and a second delay period, the first delay period being a delay from when the detector detects the object to when the first obtainer obtains the position information, the second delay period being a delay from an end of the first period to when the renderer renders the display image, the corrector includes: a first corrector that corrects, prior to the rendering of the display image by the renderer, the displacement of the display position of the content in the display image which occurs over the first delay period; and a second corrector that corrects, after the rendering of the display image by the renderer, the displacement of the display position of the content in the display image which occurs over the second delay period.

According to the above, because the displacement of the display position of the content in the display image can be corrected before and after rendering the display image by the renderer, the accuracy can be further advantageously improved in the correcting.

It is possible that data transmitted from the renderer to the second corrector includes information detected by the detector.

The above advantageously facilitates synchronization between, for example, the position information on the object detected by the detector and the display image rendered by the renderer.

It is possible that the second corrector corrects the displacement of the display position of the content in the display image by shifting the content rendered by the renderer.

The above can advantageously reduce the processing load on the corrector and also reduce a delay caused by processing in the corrector, compared with a case in which the displacement of the display position of the content is corrected by re-rendering the content.

It is possible that the corrector determines, based on a magnitude of a displacement amount of the moving body, which of the first corrector and the second corrector is to correct the displacement of the display position of the content in the display image.

The above can advantageously reduce the processing load on the corrector by performing the correcting by only one of the first corrector and the second corrector when, for example, a displacement amount of the moving body is small and the influence of the displacement amount of the moving body to the displacement of the display position of the content is small.

It is possible that the corrector determines, based on a magnitude of change per unit time in the displacement amount of the moving body, which of the first corrector and the second corrector is to correct the displacement of the display position of the content in the display image.

The above can advantageously reduce the processing load on the corrector by performing the correcting by only one of the first corrector and the second corrector when, for example, change per unit time in a displacement amount of the moving body is small and the influence of the change to the displacement of the display position of the content is small.

It is possible that the rendering system further includes: a plurality of detectors each being the detector, wherein the estimator estimates the delay period for each of the plurality of detectors.

The above aspect can advantageously facilitate improving the accuracy of correcting displacement of a display position of a content in display image, in comparison with a case where a plurality of detectors share a single delay period.

In accordance with another aspect of the present disclosure, a display system includes the above-described rendering system and the projector. The projector projects the display image onto the display medium to be viewed as a virtual image by the occupant of the moving body. The display image is rendered by the rendering system.

According to the above aspect, the occupant views the display image in which the displacement of the display position of the content has been corrected. This advantageously facilitates the occupant's recognition of the content related to the object.

In accordance with still another aspect of the present disclosure, a display control system includes a first obtainer, a second obtainer, an estimator, and a corrector. The first obtainer obtains, from a detector that detects an object in a vicinity of a moving body, position information indicating a position of the object. The second obtainer obtains movement information indicating a movement state of the moving body. The estimator estimates a delay period including a delay from when the detector detects the object to when the first obtainer obtains the position information, by comparing the position information to estimated-position information indicating an estimated position of the object which is estimated based on movement information of the moving body. The corrector corrects a displacement of a display position of a content on a display image, the displacement being caused by movement of the moving body over the delay period. Here, the display image is projected on a display medium to allow an occupant of the moving body to view the display image as a virtual image. The projecting is performed based on the position information and the movement information, and the display image includes the content related to the object.

According to the above aspect, the occupant views the display image in which the displacement of the display position of the content has been corrected. This advantageously facilitates the occupant's recognition of the content related to the object.

In accordance with still another aspect of the present disclosure, a display control system includes a display controller that controls displaying of a display image. The display image is rendered based on (i) position information that indicates a position of an object in a vicinity of a moving body and is obtained by a detector for detecting the object and (ii) moving information that indicates a movement state of the moving body, the display image being projected onto a display medium to allow an occupant of the moving body to view the display image as a virtual image, the display image including a content related to the object. Here, the display controller controls the displaying of the display image to cause a corrected display image to be projected on the display medium. The corrected display image is the display image in which a displacement of a display position of the content is corrected, the displacement being caused by movement of the moving body over a delay period. The delay period is a period including a delay from when the detector detects the object to when the position information is obtained, the delay being estimated by comparing the position information to estimated-position information indicating an estimated position of the object which is estimated based on movement information of the moving body.

According to the above aspect, the occupant views the display image in which the displacement of the display position of the content has been corrected. This advantageously facilitates the occupant's recognition of the content related to the object.

In accordance with still another aspect of the present disclosure, a rendering method includes a first obtaining step, a second obtaining step, a rendering step, an estimating step, and a correcting step. The first obtaining step is a step of obtaining, from a detector that detects an object in a vicinity of a moving body, position information indicating a position of the object. The second obtaining step is a step of obtaining movement information indicating a movement state of the moving body. The rendering step is a step of rendering a display image including a content related to the object based on the position information and the movement information, the display image being projected on a display medium to be viewed as a virtual image by an occupant of the moving body. The estimating step is a step of estimating a delay period including a delay by comparing the position information to estimated-position information, the delay being a time period from when the detecting of the object to when the obtaining of the position information, the estimated-position information indicating an estimated position of the object which is estimated based on the movement information of the object. The correcting step is a step of correcting a displacement of a display position of the content on the display image, the displacement being caused by movement of the moving body over the delay period.

According to the above aspect, because the delay period is updated in the estimating step, the accuracy can be advantageously improved in correcting the displacement of the display position of the content related to the object in the display image, compared with a case in which the delay period is a fixed value. In addition, because the delay period is updated in the estimating step, there is no need to preset a delay period specific to the configuration (design) of the display system. This advantageously facilitates designing the display system.

In accordance with still another aspect of the present disclosure, a program causes one or more processors to perform the above-described rendering method.

According to the above aspect, because the delay period is updated in the estimating step, the accuracy can be advantageously improved in correcting the displacement of the display position of the content related to the object in the display image, compared with a case in which the delay period is a fixed value. In addition, because the delay period is updated in the estimating step, there is no need to preset a delay period specific to the configuration (design) of the display system. This advantageously facilitates designing the display system.

General or specific aspects of the present disclosure may be implemented to a system, a device, a method, an integrated circuit, a computer program, a computer-readable recording medium such as a Compact Disc-Read Only Memory (CD-ROM), or any given combination thereof.

Hereinafter, Embodiments 1 and 2 will be described in detail with reference to the accompanying Drawings. The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure.

Among elements in the following embodiments, those not described in any one of the independent claims indicating the broadest concept of the present disclosure are described as optional elements.

It should be noted that the respective figures are schematic diagrams and are not necessarily precise illustrations. Additionally, components that are essentially the same share like reference signs in the figures.

Embodiment 1

<Configuration>

Figure 2:
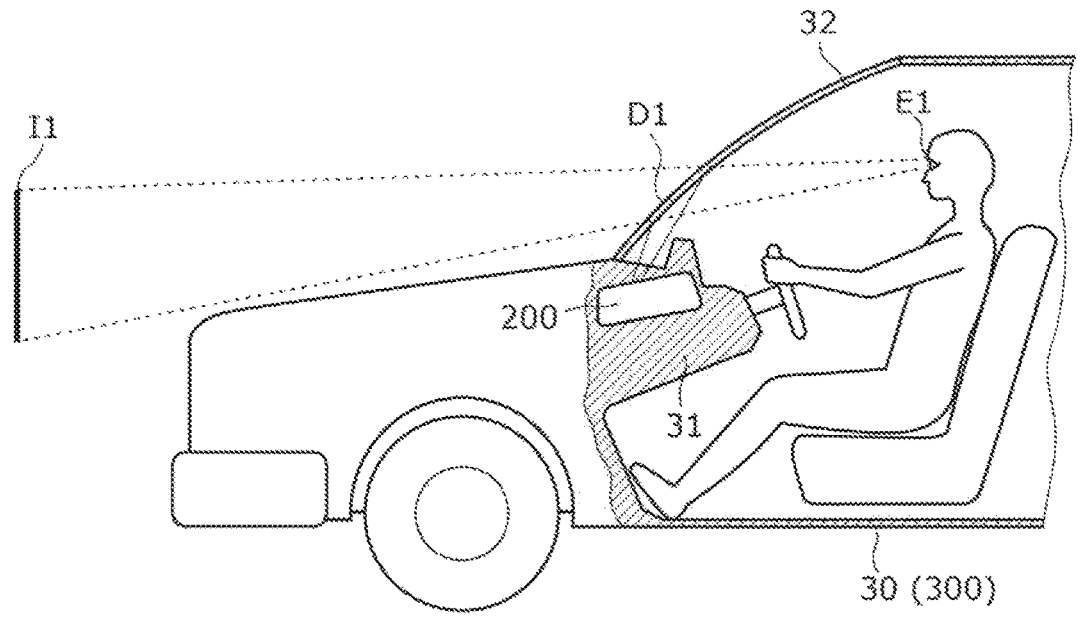
FIG. 2 is a diagram illustrating an exemplary use of the display system in embodiment 1.

FIG. 1 is a block diagram illustrating an overview of display system 200 having rendering system 100 in embodiment 1. FIG. 2 is a diagram illustrating an exemplary use of display system 200 in embodiment 1. Display system 200 in embodiment 1 is, for example, a head-up display (HUD) system that is installed in moving body 300 such as vehicle 30 and that projects an image (display image 8) representing information onto predetermined area D1 on a display medium such as windshield 32 to allow an occupant having viewpoint E1 to view a virtual image showing the information.

In the example shown in FIG. 2, display system 200 is provided in dashboard 31 of vehicle 30. In the visual field of the occupant having viewpoint E1, a virtual image is viewed as being reflected on virtual HUD display surface I1 and located ahead of vehicle 30. This display system allows information to appear as a virtual image superimposed on a real view in the occupant's visual field.

Although embodiment 1 will describe vehicle 30 as an example of moving body 300 to which display system 200 is applied, moving body 300 is not limited to vehicle 30 but may be a watercraft or an aircraft, for example. Further, although embodiment 1 will specifically describe a driver of a vehicle as an example of the occupant of moving body 300, the occupant is not limited to a driver.

Figure 3:
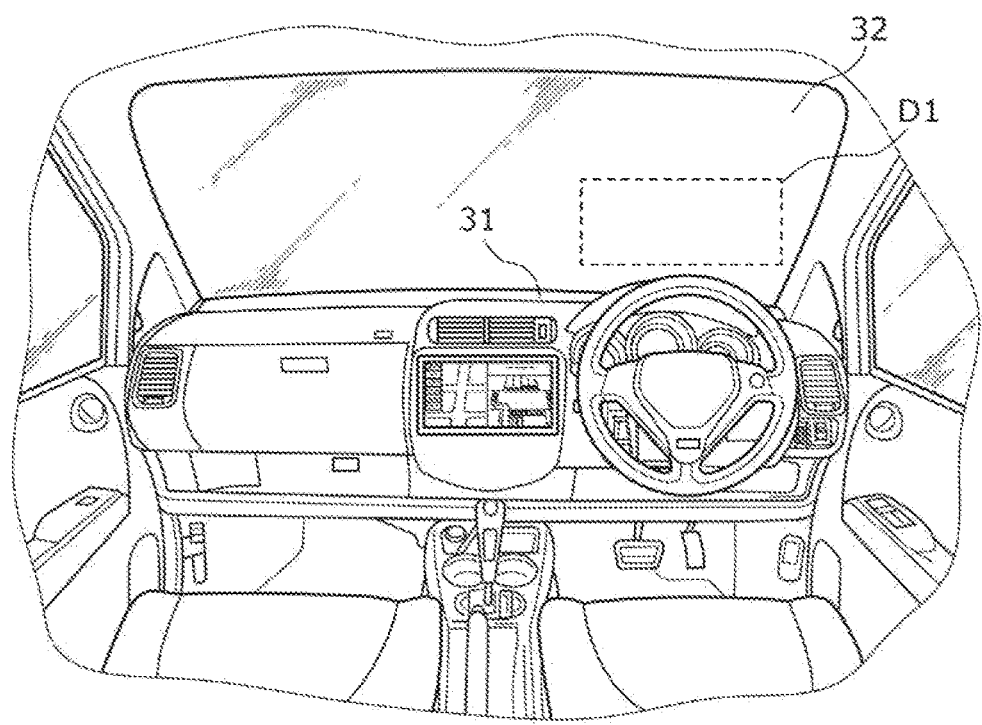
FIG. 3 is a diagram illustrating an example of a predetermined area onto which an image displayed by the display system is projected in embodiment 1.

The display range of the virtual image displayed in the occupant's visual field by image projection in display system 200 (i.e., the maximum range capable of displaying the maximum size of the virtual image) is limited to a certain area that depends on, for example, the positioning or structure of display system 200. FIG. 3 is a diagram illustrating an example of predetermined area D1 onto which the image displayed by display system 200 is projected in embodiment 1. In other words, FIG. 3 is a diagram, viewed from the inside of vehicle 30, illustrating an example of the range of predetermined area D1 on windshield 32 (the display medium) onto which the image displayed by display system 200 is projected. As shown in FIG. 3, predetermined area D1 corresponds to a certain angle of view (a certain viewing angle) in the visual field of the occupant (here, the driver) looking ahead of vehicle 30.

As shown in FIG. 1, display system 200 includes rendering system 100 and projector 21.

Projector 21 projects an image onto windshield 32 under the control of rendering system 100 to allow the driver of vehicle 30 to view a virtual image (an image shown on HUD display surface I1). In other words, projector 21 projects display image 8 rendered by rendering system 100 onto windshield 32 (the display medium) to be viewed as a virtual image by the occupant of vehicle 30 (moving body 300). Projector 21 includes a liquid crystal display (LCD), a plane mirror, and a concave mirror, for example. The image rendered by rendering system 100 is displayed on the LCD. The image displayed on the LCD is reflected off the plane mirror and enlarged by the concave mirror, and then projected onto windshield 32.

Rendering system 100 includes a computer having memory and a processor (a microprocessor), for example. The processor executes a control program stored in the memory and controls components of rendering system 100 to implement various functions. The memory may be read only memory (ROM) having programs and data stored therein, or random access memory (RAM) used for storing data and other items in executing programs, and may include nonvolatile memory, for example. The control program defines, for example, display control processing for displaying an image on the display medium to allow the driver of vehicle 30 to view a virtual image.

Rendering system 100 has the following functions. According to the control program for display control processing executed by the processor, rendering system 100 obtains pieces of information, for example from object detection sensor 41 and navigation device 42 each serving as detector 400, and from vehicle information detection sensor 5. Based on the information obtained, rendering system 100 controls display provided by projector 21.

Object detection sensor 41, which is a sensor for advanced driver-assistance systems (ADAS), is installed in the interior or exterior of vehicle 30. Object detection sensor 41 senses the view in front of the occupant (here, the driver) of vehicle 30 periodically (e.g., at predetermined time intervals, such as every 1/60 second). In embodiment 1, object detection sensor 41 includes an image sensor (a camera) that may detect light in the view in front. Object detection sensor 41 may also include, for example, a radar that detects reflection of electromagnetic waves. Object detection sensor 41 outputs information resulting from the sensing to rendering system 100.

For example, object detection sensor 41 recognizes object 6 in the vicinity of the vehicle (e.g., within 100 m ahead) in the view in front of vehicle 30 and outputs, as the result of the recognition, information such as the details and position of object 6. Object 6 is, for example, a moving body (e.g., another vehicle or a pedestrian), a road sign, a white line on the road, a sign on the road, a curb, a guardrail, a signal, a utility pole, or a building. Because object detection sensor 41 in embodiment 1 includes a camera, object detection sensor 41 recognizes object 6 by performing image processing, such as pattern matching, on an image of the view in front of the vehicle resulting from the sensing. In an example in which object detection sensor 41 is a radar, object detection sensor 41 may extract and recognize object 6 by performing techniques such as clustering or machine learning on information resulting from the sensing. As the position of object 6, object detection sensor 41 may determine a position relative to vehicle 30, or an absolute position based on positioning information obtained by a positioning system such as a global positioning system (GPS).

Navigation device 42, including a positioning system such as a GPS receiver, has a vehicle navigation function based on positioning information obtained by the positioning system and on map data. Navigation device 42 may include a storage device such as a memory device or a hard disk device, or a transceiver, for example for obtaining the map data from an external entity through communication and storing the map data. Navigation device 42 may measure the current position of vehicle 30 using the positioning system, and compute the moving direction of the vehicle based on the current position and on the position of vehicle 30 measured previously. Navigation device 42 recognizes object 6 within 100 m ahead of vehicle 30 in the moving direction based on the map data, and outputs, as the result of the recognition, information such as the details and position of object 6 to rendering system 100. Object 6 may be an intersection, for example.

Vehicle information detection sensor 5 includes sensors for detecting the state of vehicle 30, such as a speed sensor and a gyro sensor, and outputs information indicating the detected state to rendering system 100. The state of vehicle 30 may include, for example, the vehicle speed, the rotation speed (such as the rotation speed of the engine), the steering angle (the rotation angle of the steering wheel), the vibration of vehicle 30, the gradient (the pitch), the acceleration, or the yaw rate.

Rendering system 100 includes first obtainer 11, second obtainer 12, renderer 13, estimator 14, and corrector 15.

First obtainer 11 obtains position information indicating the position of object 6 from detector 400 that detects object 6 in the vicinity of vehicle 30 (moving body 300). In embodiment 1, the position information indicates the position of object 6 relative to vehicle 30. First obtainer 11 is the agent of first obtaining step ST1 in a rendering method. First obtainer 11 in embodiment 1 obtains the position information (e.g., position information on a person ahead of vehicle 30) by obtaining the detection result from object detection sensor 41 serving as detector 400. First obtainer 11 in embodiment 1 also obtains the position information (e.g., position information on an intersection ahead of vehicle 30) by obtaining the recognition result from navigation device 42 serving as detector 400. Thus, first obtainer 11 in embodiment 1 obtains the position information from each of multiple (here, two) detectors 400. First obtainer 11 may also obtain the position information from single detector 400 or from each of three or more detectors 400.

Second obtainer 12 obtains movement information indicating the movement state of vehicle 30 (moving body 300). Second obtainer 12 is the agent of second obtaining step ST2 in the rendering method. Second obtainer 12 in embodiment 1 obtains the movement information by obtaining the detection result from vehicle information detection sensor 5. The movement information may thus include, for example, the vehicle speed, the rotation speed (such as the rotation speed of the engine), the steering angle (the rotation angle of the steering wheel), the gradient (the pitch), the acceleration, or the yaw rate.

Based on the position information obtained by first obtainer 11 and the movement information obtained by second obtainer 12, renderer 13 renders display image 8. Display image 8, including content 7 related to object 6, will be projected onto windshield 32 (the display medium) to be viewed as a virtual image by the occupant (here, the driver) of vehicle 30 (moving body 300). Renderer 13 is the agent of rendering step ST3 in the rendering method.

Specifically, based on the position of object 6 obtained by first obtainer 11 and the position and moving direction of vehicle 30 (moving body 300) obtained last by second obtainer 12, renderer 13 determines the display position of content 7 related to object 6 at predetermined display intervals (e.g., every 1/60 second). Renderer 13 renders display image 8 including content 7 so that content 7 is projected on windshield 32 (the display medium) at the display position determined. The display position of content 7 is a position in a display coordinate space and is not a position in the real space.

Content 7, which is a displayed element including an indication such as a text string, a symbol, a geometrical figure, or an image, may be said to be a component of a certain image for one frame displayed on the LCD of projector 21. Content 7 may include, for example, an image that highlights object 6 in display image 8. Specifically, if object 6 is a person ahead of vehicle 30, content 7 may be a mark highlighting the person. The mark may include, for example, a circle surrounding the person's feet or a rectangular frame surrounding the entire person. If object 6 is the road ahead of vehicle 30, content 7 may be an arrow indicating the direction in which vehicle 30 is expected to move along a route set by navigation device 42. The arrow may indicate straight ahead, right turn, or left turn, for example. Content 7 is not limited to a mark or an arrow but may be any item related to object 6. For example, content 7 may be a red line superimposed on a white line defining the lane for warning vehicle 30 likely to enter an adjoining lane.

Corrector 15 corrects a displacement of the display position of content 7 in display image 8 which is caused by the movement of vehicle 30 (moving body 300) over a delay period Td. Corrector 15 is the agent of correcting step ST5 in the rendering method. The delay period Td is a time period that includes a delay between the detection of object 6 by detector 400 and the obtainment of the position information by first obtainer 11. That is, rendering system 100 obtains the position of content 7 with a delay with respect to, not simultaneously with, the detection of the position of content 7 by detector 400. Consequently, rendering display image 8 with reference to the position of content 7 at a time of obtaining the position information by first obtainer 11 may create a displacement between where content 7 should be displayed and the position of content 7 based on the detection by detector 400, in a manner that depends on the movement state of vehicle 30 (moving body 300). To address this, corrector 15 corrects the displacement of the display position of content 7 to enable renderer 13 to render display image 8 such that content 7 is displayed at a correct display position.

Figure 4:
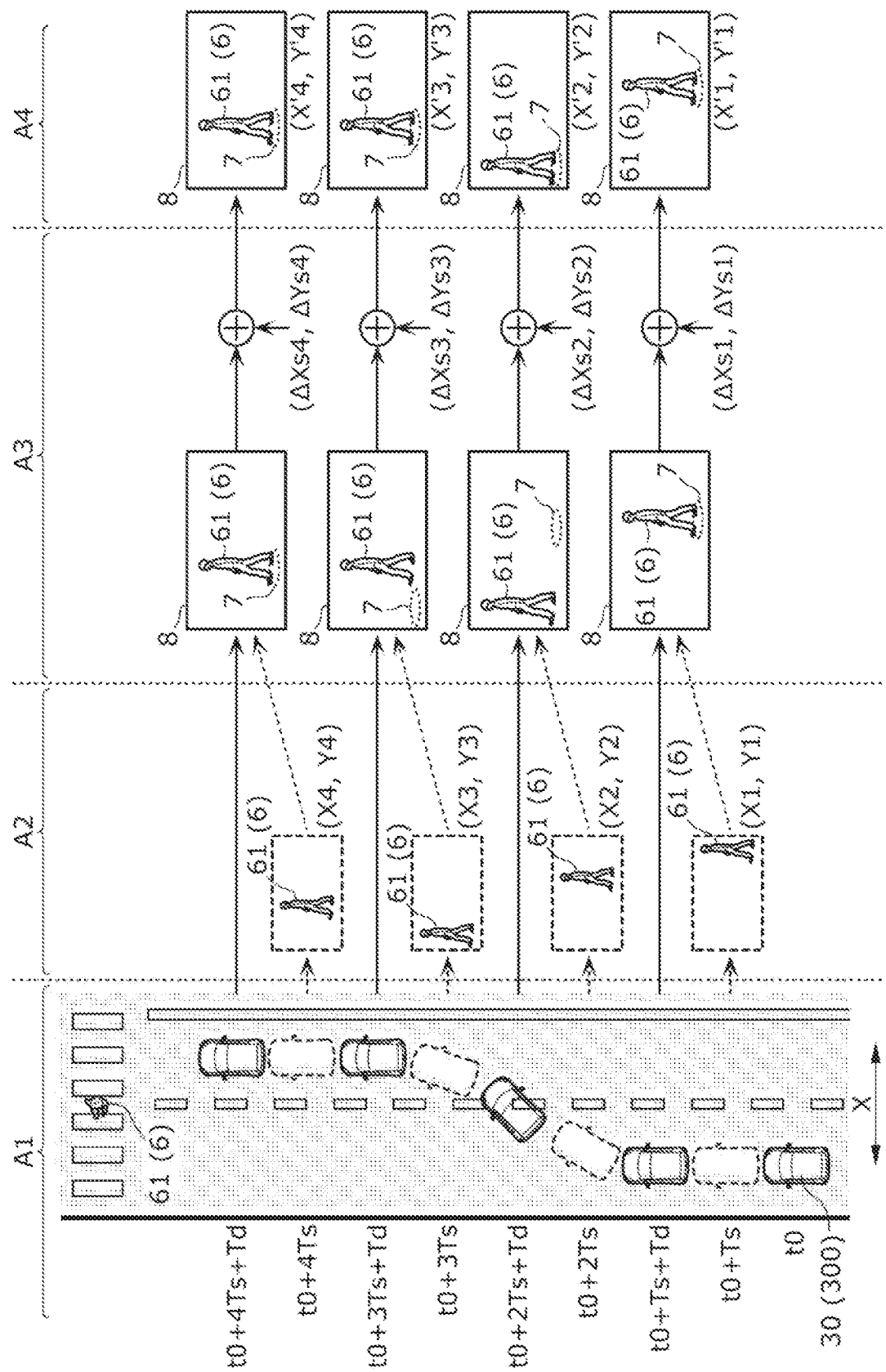
FIG. 4 is a diagram for describing correction processing by a corrector in the rendering system in embodiment 1.

Processing of correcting the displacement of the display position of content 7 by corrector 15 will be described below with reference to FIG. 4. FIG. 4 is a diagram for describing the correction processing by corrector 15 in rendering system 100 in embodiment 1.

In FIG. 4, first section A1 shows changes of vehicle 30 (moving body 300) over time with respect to object 6 (here, person 61). Second section A2 shows images of front of vehicle 30 captured by detector 400 (here, the camera serving as object detection sensor 41). Third section A3 shows display images 8 rendered by renderer 13 without correction processing by corrector 15. Fourth section A4 shows images rendered by renderer 13 with correction processing by corrector 15.

First section A1 shows a situation in which vehicle 30 running in the left lane transfers to the right lane while person 61 is walking on a pedestrian crossing ahead of vehicle 30. In first section A1, t0 denotes the start time, Ts denotes a detection cycle of detector 400, and Td denotes the delay period.

Second section A2 shows images captured at, from the bottom, times t0+Ts, t0+2 Ts, t0+3 Ts, and t0+4 Ts, respectively. Coordinates on the right of each image are XY coordinates indicating the position of person 61 (object 6) in the image. The X-axis direction corresponds to the horizontal direction in the image, and the Y-axis direction corresponds to the vertical direction in the image.

Third section A3 shows display images 8 rendered by renderer 13 at, from the bottom, times t0+Ts+Td, t0+2 Ts+Td, t0+3 Ts+Td, and t0+4 Ts+Td, respectively, without correction processing by corrector 15. In this manner, the times at which renderer 13 renders display image 8 are delayed by the delay period Td with respect to the times at which the camera (detector 400) captures (detects) person 61 (object 6).

As such, determining the display position of content 7 with reference to the position information (the XY coordinates) on object 6 obtained from detector 400 may create a displacement in display image 8 between the display position of object 6 and the display position of content 7. For example, at time t0+2 Ts at which the camera captures person 61, vehicle 30 is in the left lane. However, at time t0+2 Ts+Td at which renderer 13 renders display image 8, vehicle 30 is in the process of moving from the left lane to the right lane, resulting in a change in the position of person 61 relative to vehicle 30. Display image 8 rendered by renderer 13 at time t0+2 Ts+Td therefore shows a displacement between the display position of person 61 and the display position of content 7 (here, a circular mark) by the displacement amount in the position of vehicle 30 along the X-axis over the delay period Td. Similarly, display image 8 rendered by renderer 13 at time t0+3 Ts+Td shows a displacement between the display positions.

Corrector 15 therefore corrects the displacement of the display position of content 7 in display image 8. This is done by, based on the movement information obtained by second obtainer 12, calculating the displacement amount in the position of vehicle 30 (moving body 300) over the delay period Td, and shifting the display position of content 7 by the calculated amount. Specifically, let the coordinates Xn, Yn (n is a natural number) be the position information on object 6 obtained by first obtainer 11. Corrector 15 refers to the movement information obtained by second obtainer 12 to calculate the displacement amount $\Delta Xsn$, $\Delta Ysn$ in the position of object 6 relative to vehicle 30 over the previous delay period Td that ends at the time of obtainment of the position information. $\Delta Xsn$ denotes the displacement amount in the position along the X-axis, and $\Delta Ysn$ denotes the displacement amount in the position along the Y-axis.

Corrector 15 adds the calculated displacement amount $\Delta Xsn$, $\Delta Ysn$ in the position to the coordinates Xn, Yn of object 6 to obtain the coordinates X'n, Y'n, which indicate a corrected display position of content 7. Renderer 13 renders display image 8 that includes content 7 to be displayed at the coordinates X'n, Y'n calculated by corrector 15 as a display position of content 7.

Figure 5:
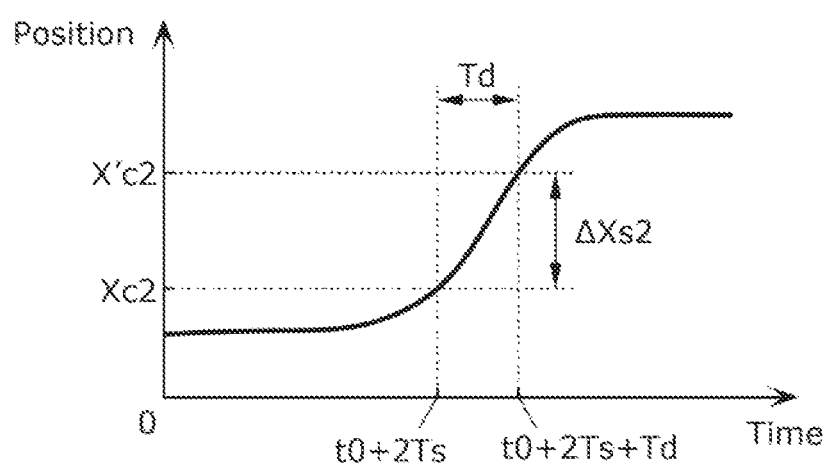
FIG. 5 is a graph for describing the correction processing by the corrector in the rendering system in embodiment 1.

A specific example of the correction processing by corrector 15 will be described with reference to FIGS. 4 and 5. FIG. 5 is a graph for describing the correction processing by corrector 15 in rendering system 100 in embodiment 1. The following description will focus on correcting the position of content 7 along the X-axis in display image 8. Although not described, the position of content 7 along the Y-axis in display image 8 may be corrected in a similar manner.

In FIG. 5, the ordinate indicates the position of vehicle 30 along the X-axis, and the abscissa indicates time. As shown in FIG. 5, for example, Xc2 is the position of vehicle 30 along the X-axis at time t0+2 Ts at which detector 400 detects object 6, whereas X'c2 is the position of vehicle 30 along the X-axis at time t0+2 Ts+Td at which renderer 13 renders display image 8. The displacement amount $\Delta Xs2$ in the position of object 6 along the X-axis relative to vehicle 30 over the delay period Td is calculated as the difference between X'c2 and Xc2.

Corrector 15 calculates the coordinate X'2 of object 6 along the X-axis at time t0+2 Ts+Td by adding the calculated displacement amount $\Delta Xs2$ to the coordinate X2 of object 6 along the X-axis at time t0+2 Ts obtained by first obtainer 11 at time t0+2 Ts+Td. It is to be noted that the direction of the change in the position of object 6 relative to vehicle 30 is opposite to the direction of the change in the position of vehicle 30. Therefore, for example, if the change in the position of vehicle 30 is in the positive direction (here, rightward along the X-axis), corrector 15 adds a negative displacement amount in the position to the coordinate of object 6 so that the display position of object 6 is shifted in the negative direction (here, leftward along the X-axis).

Renderer 13 renders display image 8 by applying the coordinate X'2 of object 6 along the X-axis calculated by corrector 15 to the coordinate X'2 of content 7. As shown in fourth section A4 in FIG. 4, the display position of person 61 now substantially matches the display position of content 7 (here, the circular mark) in display image 8 rendered by renderer 13 at time t0+2 Ts+Td. Corrector 15 thus corrects the displacement of the display position of content 7.

Estimator 14 estimates the delay period Td by comparing the position information obtained by first obtainer 11 and estimated-position information indicating the position of object 6 estimated based on the movement information on vehicle 30 (moving body 300) obtained by second obtainer 12. Estimator 14 is the agent of estimating step ST4 in the rendering method.

Here, the reason that estimator 14 estimates the delay period Td will be described. As described above, corrector 15 can correct the displacement of the display position of content 7 in display image 8 by calculating the displacement amount in the position of vehicle 30 over the delay period Td. However, the delay period Td is actually not a uniquely determined value. For example, the delay period Td may vary with the type of vehicle 30, i.e., with the configuration (design) of display system 200. The delay period Td may also vary in real time with, for example, the state (e.g., the processing load or the communication state) of a processor of display system 200, such as a central processing unit (CPU) or a graphics processing unit (GPU).

If corrector 15 performs the above correction processing using a fixed delay period Td, corrector 15 may not be able to accurately calculate the displacement amount in the position of vehicle 30 because of actual variations in the delay period Td. This may result in a failure to accurately correct the displacement of the display position of content 7 in display image 8. The inventor of the present application has found out that estimating and updating the delay period Td by estimator 14 improves the accuracy of correcting the displacement of the display position of content 7 in display image 8 by corrector 15.

Figure 6:
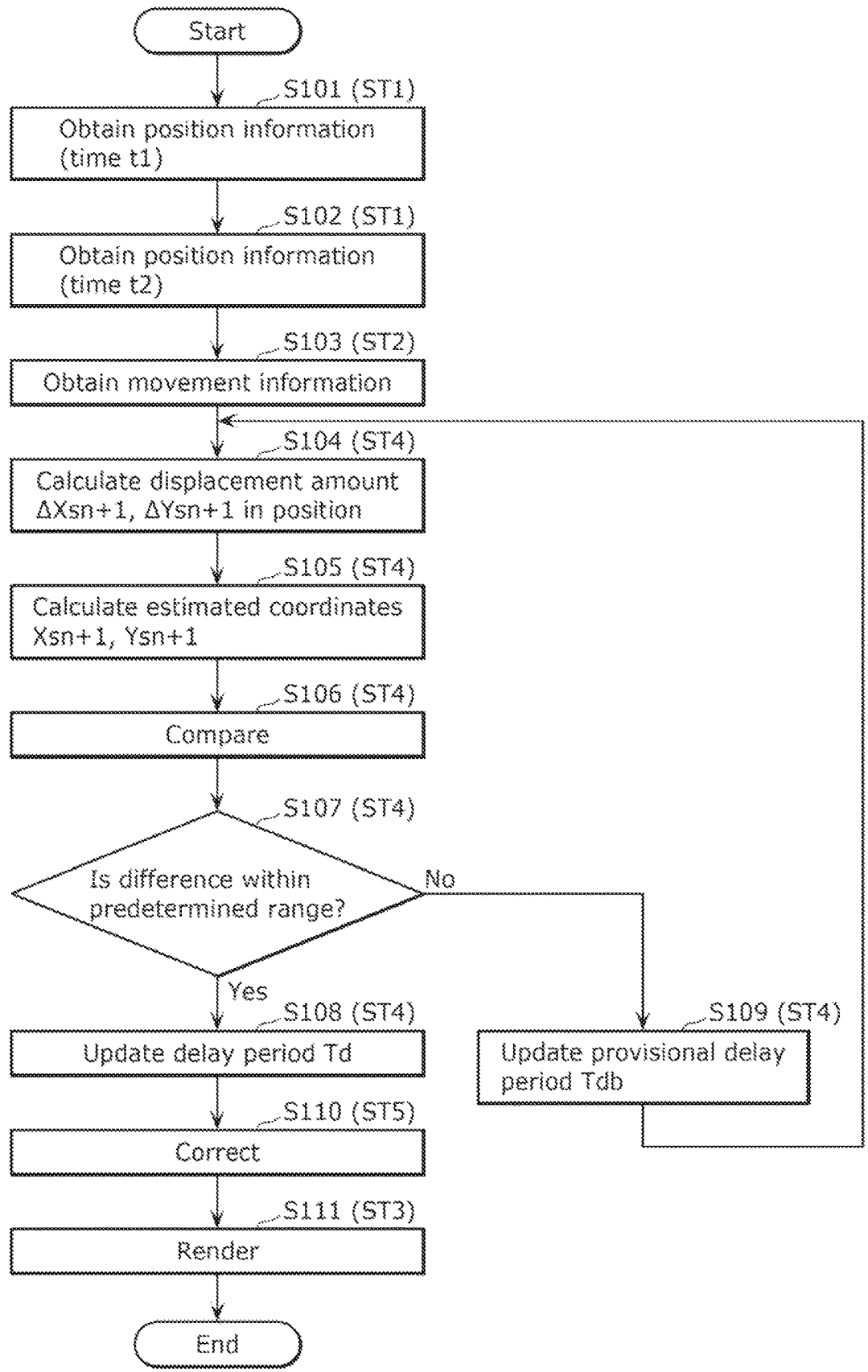
FIG. 6 is a flowchart illustrating exemplary operations of the rendering system in embodiment 1.

Processing of estimating the delay period Td by estimator 14 will be described below with reference to FIG. 6. FIG. 6 is a flowchart illustrating exemplary operations of rendering system 100 in embodiment 1. A provisional delay period Tdb in the following description is the delay period Td referred to by corrector 15 before estimator 14 performs the estimation processing, i.e., the delay period Td before being updated.

First, at certain time t1, first obtainer 11 obtains the position information from detector 400 (S101). At time t2 (=t1+Ts), which is one detection cycle Ts after time t1, first obtainer 11 obtains the position information from detector 400 (S102). The processing at S101 and S102 corresponds to first obtaining step ST1 in the rendering method. Second obtainer 12 periodically obtains the movement information on vehicle 30 (moving body 300) from vehicle information detection sensor 5 (S103). The processing at S103 corresponds to second obtaining step ST2 in the rendering method.

In the following, the coordinates Xn, Yn are the position information on object 6 obtained by first obtainer 11 at time t1, and the coordinates Xn+1, Yn+1 are the position information on object 6 obtained by first obtainer 11 at time t2. The following description assumes that object 6 does not move during the period between times t1 and t2. In other words, the detection cycle Ts is a cycle such that object 6 does not or substantially does not change in position during the cycle.

With reference to a history of the movement information on vehicle 30 (moving body 300) obtained by second obtainer 12, estimator 14 calculates the displacement amount $\Delta Xsn+1$, $\Delta Ysn+1$ in the position of object 6 relative to vehicle 30 over a predetermined time period (S104). The predetermined time period starts at time t1', which is one provisional delay period Tdb before time t1, and ends at time t2', which is one detection cycle Ts after time t1'. The displacement amount $\Delta Xsn+1$, $\Delta Ysn+1$ in the position may vary with how far the start point goes back from time t1, that is, vary with the value of the provisional delay period Tdb.

Estimator 14 adds the calculated displacement amount $\Delta Xsn+1$, $\Delta Ysn+1$ in the position to the coordinates Xn, Yn of object 6 obtained by first obtainer 11 at time t1 to calculate the estimated coordinates Xsn+1, Ysn+1, which is estimated-value information on object 6 (S105). Estimator 14 compares the coordinates Xn+1, Yn+1 of object 6 obtained by first obtainer 11 at time t2 with the calculated estimated coordinates Xsn+1, Ysn+1 (S106).

Figure 7:
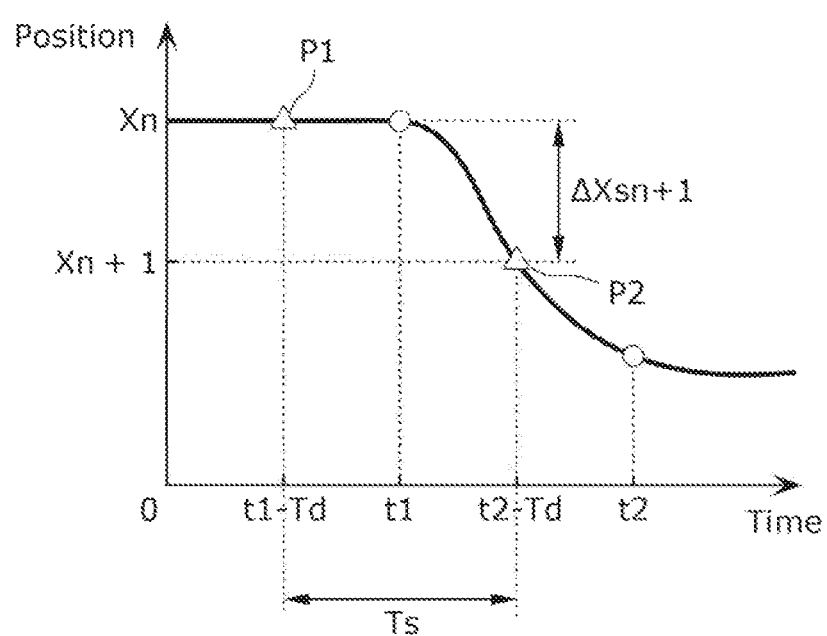
FIG. 7 is a graph for describing exemplary operations of the rendering system in embodiment 1.

Here, the purpose of the above processing at S106 will be described with reference to FIG. 7. FIG. 7 is a graph for describing exemplary operations of rendering system 100 in embodiment 1. In FIG. 7, the ordinate indicates the position of object 6 along the X-axis relative to vehicle 30, and the abscissa indicates time. Although not described, the position of object 6 along the Y-axis relative to vehicle 30 may be processed in a similar manner.

As shown in FIG. 7, the coordinate Xn of object 6 obtained by first obtainer 11 at time t1 is actually the coordinate of object 6 detected by detector 400 at time t1-Td (see P1 in FIG. 7). The coordinate Xn+1 of object 6 obtained by first obtainer 11 at time t2 (=t1+Ts) is actually the coordinate of object 6 detected by detector 400 at time t1-Td+Ts (see P2 in FIG. 7). The coordinate Xn+1 of object 6 at time t1-Td+Ts is the sum of the coordinate Xn of object 6 at time t1-Td and the displacement amount ΔXsn+1 in the position of object 6 over the detection cycle Ts starting at time t1-Td. Therefore, if the provisional delay period Tdb matches the actual delay period Td, the coordinate Xn+1 of object 6 matches the estimated coordinate Xsn+1. By contrast, if the provisional delay period Tdb does not match the actual delay period Td, the coordinate Xn+1 of object 6 does not match the estimated coordinate Xsn+1 because of a difference in the displacement amount ΔXsn+1 in the position.

If the above comparison indicates that the difference between the coordinates Xn+1, Yn+1 of object 6 and the estimated coordinates Xsn+1, Ysn+1 is within a predetermined range, or in other words, the coordinate pairs substantially match each other (Yes at S107), estimator 14 sets the delay period Td to the provisional delay period Tdb, that is, updates the delay period Td to the provisional delay period Tdb (S108). "Updating" here includes maintaining the delay period Td used before the estimation processing by estimator 14.

If the difference between the coordinates Xn+1, Yn+1 of object 6 and the estimated coordinates Xsn+1, Ysn+1 is outside the predetermined range, or in other words, the coordinate pairs do not substantially match each other (No at S107), estimator 14 updates the provisional delay period Tdb (S109) and performs the above processing at S104 to S106 again. In the processing at S109, estimator 14 increases the provisional delay period Tdb by a predetermined value if the difference between the coordinates Xn+1, Yn+1 of object 6 and the estimated coordinates Xsn+1, Ysn+1 is a positive value, and decreases the provisional delay period Tdb by a predetermined value if the difference is a negative value.

Estimator 14 repeats the above processing sequence until the comparison in the processing at S106 indicates that the difference between the coordinates Xn+1, Yn+1 of object 6 and the estimated coordinates Xsn+1, Ysn+1 falls within the predetermined range. The above processing at S104 to S109 corresponds to estimating step ST4 in the rendering method. The delay period Td can thus be updated.

Using the delay period Td updated by estimator 14, corrector 15 corrects the displacement of the display position of content 7 in display image 8 (S110). The processing at S110 corresponds to correcting step ST5 in the rendering method. With reference to the display position of content 7 corrected by corrector 15, renderer 13 renders display image 8 (S111). The processing at S111 corresponds to rendering step ST3 in the rendering method. The processing at S110 and S111 may be performed in parallel with the processing at S104 to S109 corresponding to estimating step ST4.

<Advantages>

As described above, in rendering system 100 in embodiment 1, estimator 14 estimates the delay period Td by comparing the position information obtained by first obtainer 11 and the estimated-position information indicating the position of object 6 estimated based on the movement information on vehicle 30 (moving body 300) obtained by second obtainer 12. Because estimator 14 in embodiment 1 updates the delay period Td, the accuracy can be advantageously improved in correcting the displacement of the display position of content 7 related to object 6 in display image 8, compared with a case in which the delay period Td is a fixed value. In addition, because estimator 14 in embodiment 1 updates the delay period Td, there is no need to preset the delay period Td specific to the configuration (design) of display system 200. This advantageously facilitates designing display system 200.

Embodiment 2

<Configuration>

Rendering system 100 in embodiment 2 is different from rendering system 100 in embodiment 1 in that estimator 14 estimates the delay period Td by further referring to a first timestamp and a second timestamp. The first timestamp is information indicating at least a time period counted by detector 400. For example, the first time stamp is obtained along with the position information on object 6 when first obtainer 11 obtains the position information from detector 400. Second time stamp is information indicating at least a time period counted by rendering system 100. For example, second time stamp is stored in the memory along with the movement information on moving body 300 when second obtainer 12 obtains the movement information.

The first time stamp is represented as the elapsed time from the activation of detector 400, and the second time stamp is represented as the elapsed time from the activation of rendering system 100 (display system 200). The first time stamp and the second time stamp may be different due to, for example, a difference in the timing of activating detector 400 and rendering system 100. Estimator 14 in rendering system 100 in embodiment 2 updates the delay period Td by calculating and updating the time difference between the first time stamp and the second time stamp, as will be described below.

<Operations>

Figure 8:
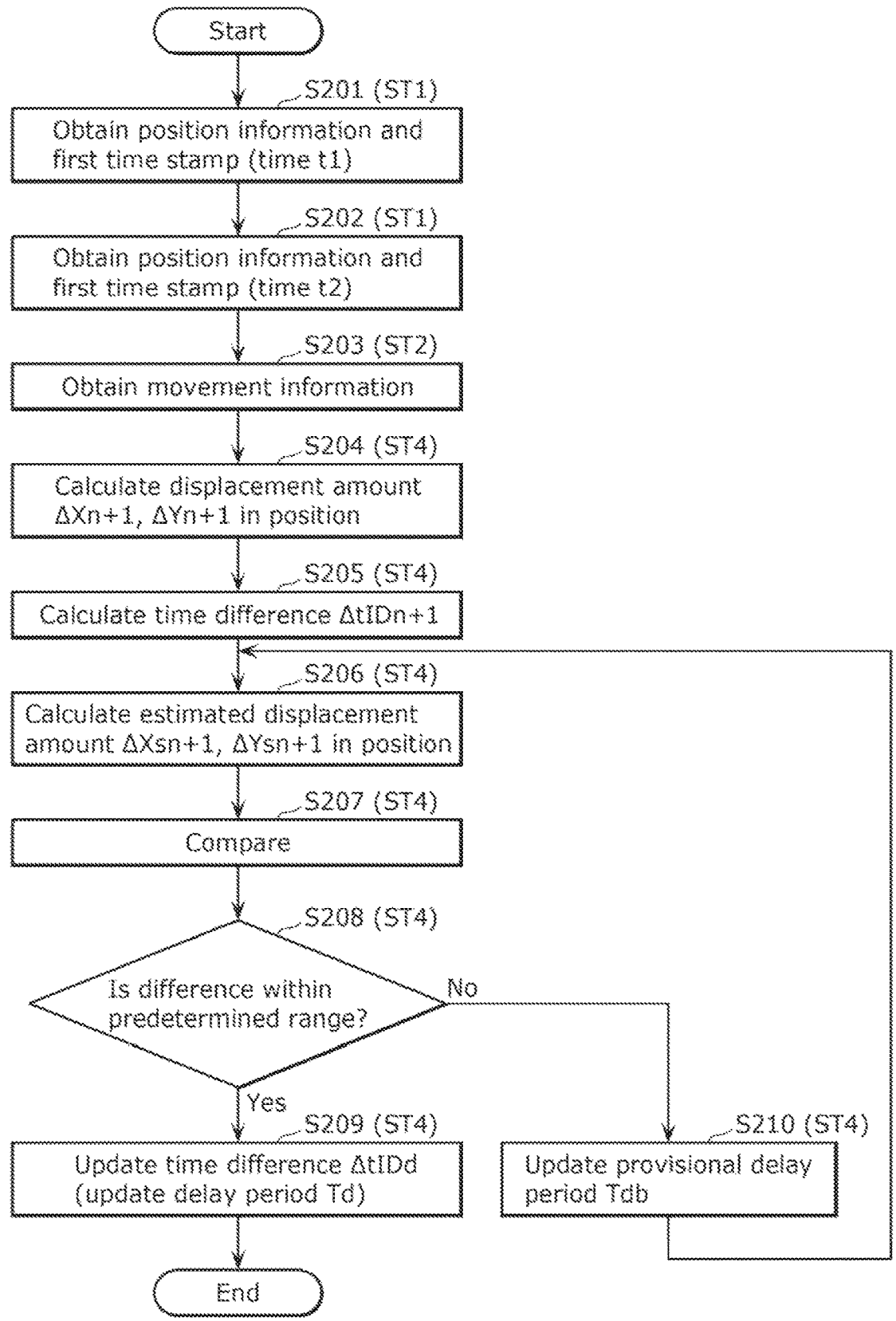
FIG. 8 is a flowchart illustrating exemplary operations of the rendering system in embodiment 2.

Processing of estimating the delay period Td by estimator 14 in rendering system 100 in embodiment 2 will be described below with reference to FIG. 8. FIG. 8 is a flowchart illustrating exemplary operations of rendering system 100 in embodiment 2.

First, at certain time t1, first obtainer 11 obtains the position information and the first time stamp from detector 400 (S201). At time t2 (=t1+Ts), which is one detection cycle Ts after time t1, first obtainer 11 obtains the position information and the first time stamp from detector 400 (S202). The processing at S201 and S202 corresponds to first obtaining step ST1 in the rendering method. Second obtainer 12 periodically obtains the movement information on vehicle 30 (moving body 300) from vehicle information detection sensor 5 (S203). The processing at S203 corresponds to second obtaining step ST2 in the rendering method.

In the following, the coordinates Xn, Yn are the position information on object 6 obtained by first obtainer 11 at time t1, and time tIDn is the time point indicated by the first time stamp obtained at time t1. Also in the following, the coordinates Xn+1, Yn+1 are the position information on object 6 obtained by first obtainer 11 at time t2, and time tIDn+1 is the time point indicated by the first time stamp obtained at time t2. As in embodiment 1, the following description assumes that object 6 does not move during the period between times t1 and t2. In other words, the detection cycle Ts is a cycle such that object 6 does not or substantially does not change in position during the cycle.

Estimator 14 calculates the displacement amount $\Delta Xn+1$, $\Delta Yn+1$ in the position of object 6 by calculating the difference between the coordinates $Xn+1$, $Yn+1$ obtained at time $t2$ and the coordinates $Xn$, $Yn$ obtained at time $t1$ (S204). Estimator 14 also calculates a time difference $\Delta tIDn+1$ by calculating the difference between time $tIDn+1$ indicated by the first time stamp obtained at $t2$ and time $tIDn$ indicated by the first time stamp obtained at time $t1$ (S205). $\Delta tIDn+1$ corresponds to the detection cycle $Ts$ counted by detector 400.

With reference to a history of the movement information on vehicle 30 (moving body 300) obtained by second obtainer 12, estimator 14 calculates an estimated displacement amount $\Delta Xsn+1$, $\Delta Ysn+1$ in the position, which is the displacement amount in the position of object 6 relative to vehicle 30 over a predetermined time period (S206). The predetermined time period starts at time $t1'$, which is one provisional delay period $Tdb$ before time $t1$ and ends at time $t2'$, which is one detection cycle $Ts$ after time $t1'$.

As described above, the second time stamp is stored in the memory along with the movement information on moving body 300 when second obtainer 12 obtains the movement information. The predetermined time period is expressed as the time difference $\Delta tIDsn+1$ between time $tIDsn+1$ and time $tIDsn$, where time $tIDsn+1$ is the time point indicated by the second time stamp corresponding to time $t2'$, and time $tIDsn$ is the time point indicated by the second time stamp corresponding to time $t1'$. Time $tIDsn$ indicated by the second time stamp corresponding to time $t1'$ may vary with the value of the provisional delay period $Tdb$.

Estimator 14 compares the displacement amount $\Delta Xn+1$, $\Delta Yn+1$ in the position of object 6 based on the position information obtained by detector 400 and the estimated displacement amount $\Delta Xsn+1$, $\Delta Ysn+1$ in the position based on the movement information on vehicle 30 (moving body 300) (S207). If the comparison indicates that the difference between the displacement amount $\Delta Xn+1$, $\Delta Yn+1$ in the position of object 6 and the estimated displacement amount $\Delta Xsn+1$, $\Delta Ysn+1$ in the position is within a predetermined range, or in other words, the amounts of change are substantially the same (Yes at S208), estimator 14 sets the delay period $Td$ to the provisional delay period $Tdb$, that is, updates the delay period $Td$ to the provisional delay period $Tdb$ (S209). In embodiment 2, the delay period $Td$ is indirectly updated by updating the time difference $\Delta tIDd$ between time $tIDsn$ indicated by the second time stamp corresponding to time $t1'$ and time $tIDn$ indicated by the first time stamp corresponding to time $t1$. "Updating" here includes maintaining the delay period $Td$ used before the estimation processing by estimator 14.

If the difference between the displacement amount $\Delta Xn+1$, $\Delta Yn+1$ in the position of object 6 and the estimated displacement amount $\Delta Xsn+1$, $\Delta Ysn+1$ in the position is outside the predetermined range, or in other words, the amounts of change are not substantially the same (No at S208), estimator 14 updates the provisional delay period $Tdb$ (S210) and performs the above processing at S206 and S207 again. In the processing at S210, estimator 14 increases the provisional delay period $Tdb$ by a predetermined value if the difference between the amounts of change in the position is a positive value, and decreases the provisional delay period $Tdb$ by a predetermined value if the difference is a negative value.

Estimator 14 repeats the above processing sequence until the comparison in the processing at S207 indicates that the difference between the displacement amount $\Delta Xn+1$, $\Delta Yn+1$ in the position of object 6 and the estimated displacement amount $\Delta Xsn+1$, $\Delta Ysn+1$ in the position falls within the predetermined range. The above processing at S204 to S210 corresponds to estimating step ST4 in the rendering method. The delay period $Td$ can thus be updated.

Figure 9:
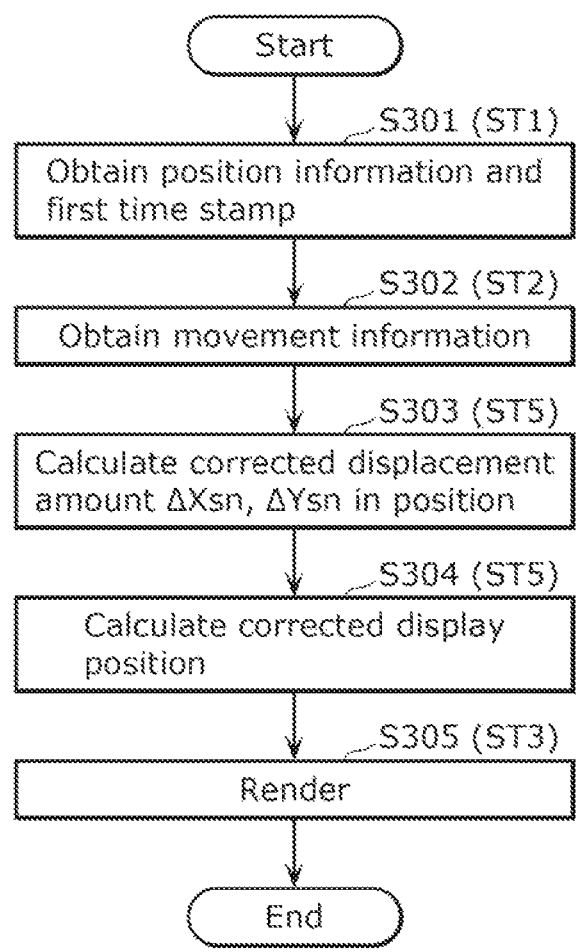
FIG. 9 is a flowchart illustrating an example of correction processing by the corrector in the rendering system in embodiment 2.

Unlike in embodiment 1, corrector 15 in rendering system 100 in embodiment 2 uses the above time difference $\Delta tIDd$ to correct the displacement of the display position of content 7 in display image 8. Correction processing by corrector 15 in rendering system 100 in embodiment 2 will be described below with reference to FIG. 9. FIG. 9 is a flowchart illustrating an example of the correction processing by corrector 15 in rendering system 100 in embodiment 2. The correction processing by corrector 15 and the rendering processing by renderer 13 to be described below may be performed in parallel with the above-described estimation processing by estimator 14.

First, at certain time $tn$, first obtainer 11 obtains the position information and the first time stamp from detector 400 (S301). The processing at S301 corresponds to first obtaining step ST1 in the rendering method. In the following, the coordinates $Xn$, $Yn$ are the position information on object 6 obtained by first obtainer 11 at time $tn$, and time $tIDn$ is the time point indicated by the first time stamp obtained by first obtainer 11 at time $tn$. Second obtainer 12 periodically obtains the movement information on vehicle 30 (moving body 300) from vehicle information detection sensor 5 (S302). The processing at S302 corresponds to second obtaining step ST2 in the rendering method.

With reference to a history of the movement information on vehicle 30 (moving body 300) obtained by second obtainer 12 and the time difference $\Delta tIDd$ estimated by estimator 14, corrector 15 calculates a corrected displacement amount $\Delta Xsn$, $\Delta Ysn$ in the position, which is the displacement amount in the position of object 6 relative to vehicle 30 over a predetermined time period (S303). The predetermined time period starts at a time point indicated by above-described time $tIDn$ plus the time difference $\Delta tIDd$, and ends at time $tn$.

Corrector 15 calculates the coordinates $X'n$, $Y'n$, indicating a corrected display position of content 7, by adding the calculated corrected displacement amount $\Delta Xsn$, $\Delta Ysn$ in the position to the above coordinates $Xn$, $Yn$ of object 6 (S304). The processing at S303 and S304 corresponds to correcting step ST5 in the rendering method. Renderer 13 renders display image 8 that includes content 7 to be displayed at the coordinates $X'n$, $Y'n$ calculated by corrector 15 as a display position of content 7 (S305). The processing at S305 corresponds to rendering step ST3 in the rendering method.

<Advantages>

As described above, in rendering system 100 in embodiment 2, estimator 14 estimates the delay period $Td$ by further referring to the first time stamp indicating at least a time period counted by detector 400, and the second time stamp indicating at least a time period counted by rendering system 100. Estimator 14 may thus calculate the time difference $\Delta tIDd$ between the first time stamp and the second time stamp only once on activation of detector 400 and rendering system 100, and does not need to repeatedly estimate the delay period $Td$ during the operation of detector 400 and rendering system 100. This can advantageously reduce the processing load on estimator 14.

Variations

While the rendering system according to the present disclosure has been described with reference to the above embodiments, the present disclosure is not limited to these embodiments. Variations of the embodiments occurring to those skilled in the art without departing from the spirit of the present disclosure may be within the scope of the present disclosure.

<Variation 1>

Figure 10:
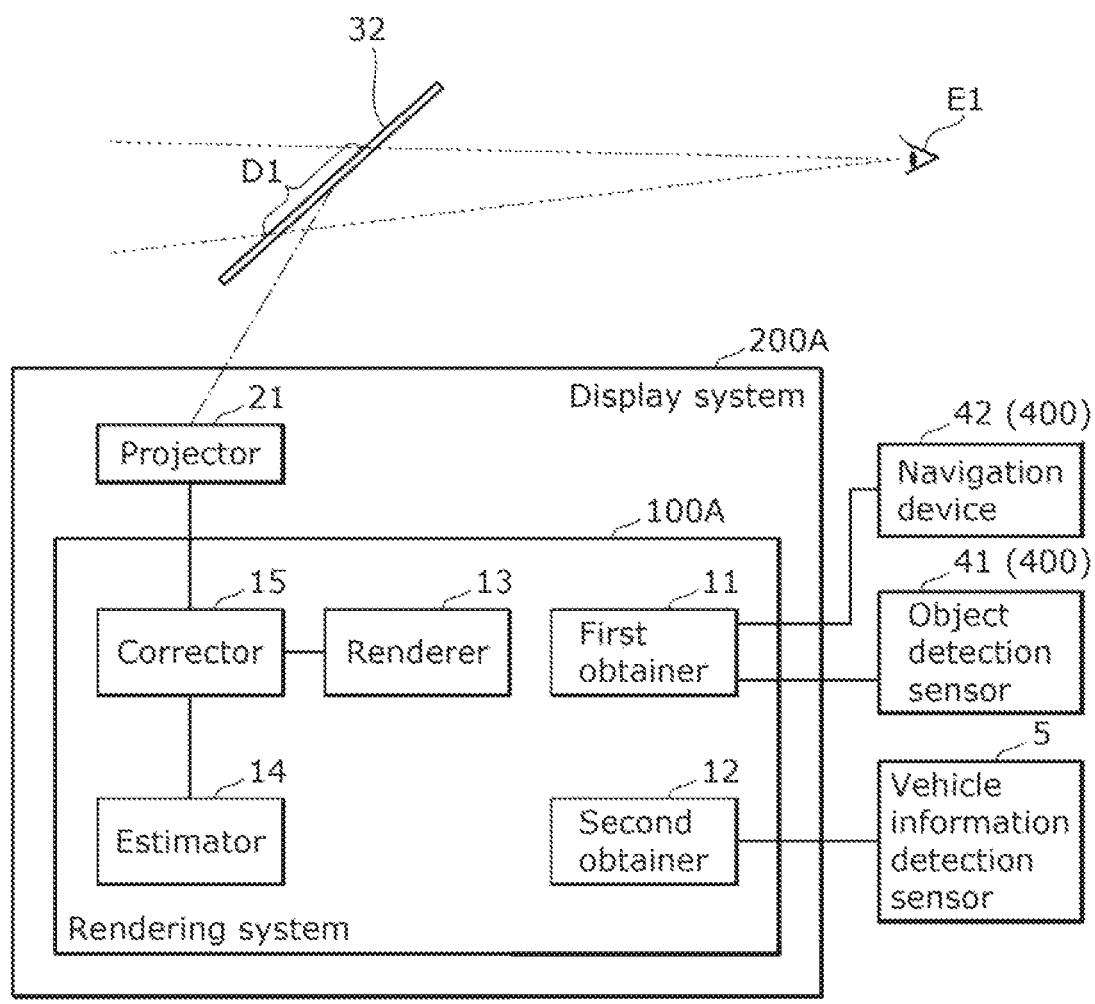
FIG. 10 is a block diagram illustrating an overview of a display system having a rendering system in variation 1.

FIG. 10 is a block diagram illustrating an overview of display system 200A having rendering system 100A in variation 1. Whereas embodiments 1 and 2 have renderer 13 located after corrector 15, variation 1 has corrector 15 located after renderer 13 as shown in FIG. 10. That is, in variation 1, corrector 15 corrects the displacement of the display position of content 7 in display image 8 after renderer 13 renders display image 8. Consequently, the delay period Td in variation 1 further includes a delay that may occur in renderer 13, in addition to the delay between the detection of object 6 by detector 400 and the obtainment of the position information by first obtainer 11. In variation 1, a delay that may occur in renderer 13 can be reflected in correcting the displacement of the display position of content 7 in display image 8. This advantageously facilitates improving the accuracy of the correction.

In variation 1, data communication between renderer 13 and corrector 15 involves sending image data rendered by renderer 13 to corrector 15. The image data may have embedded therein data such as the position information on object 6, the time stamps, or the area of content 7 in display image 8. That is, in this aspect, the data sent from renderer 13 to corrector 15 may include information resulting from the detection by detector 400. This aspect advantageously facilitates synchronization between, for example, the position information on object 6 detected by detector 400 and display image 8 rendered by renderer 13.

In variation 1, when correcting the displacement of the display position of content 7 in display image 8, corrector 15 may shift rendered content 7 to a corrected display position in display image 8, rather than re-rendering content 7. That is, corrector 15 may correct the displacement of the display position of content 7 in display image 8 by shifting content 7 rendered by renderer 13. Compared with a case in which the displacement of the display position of content 7 is corrected by re-rendering content 7, this aspect can advantageously reduce the processing load on corrector 15 and also reduce a delay caused by processing in corrector 15.

<Variation 2>

Figure 11:
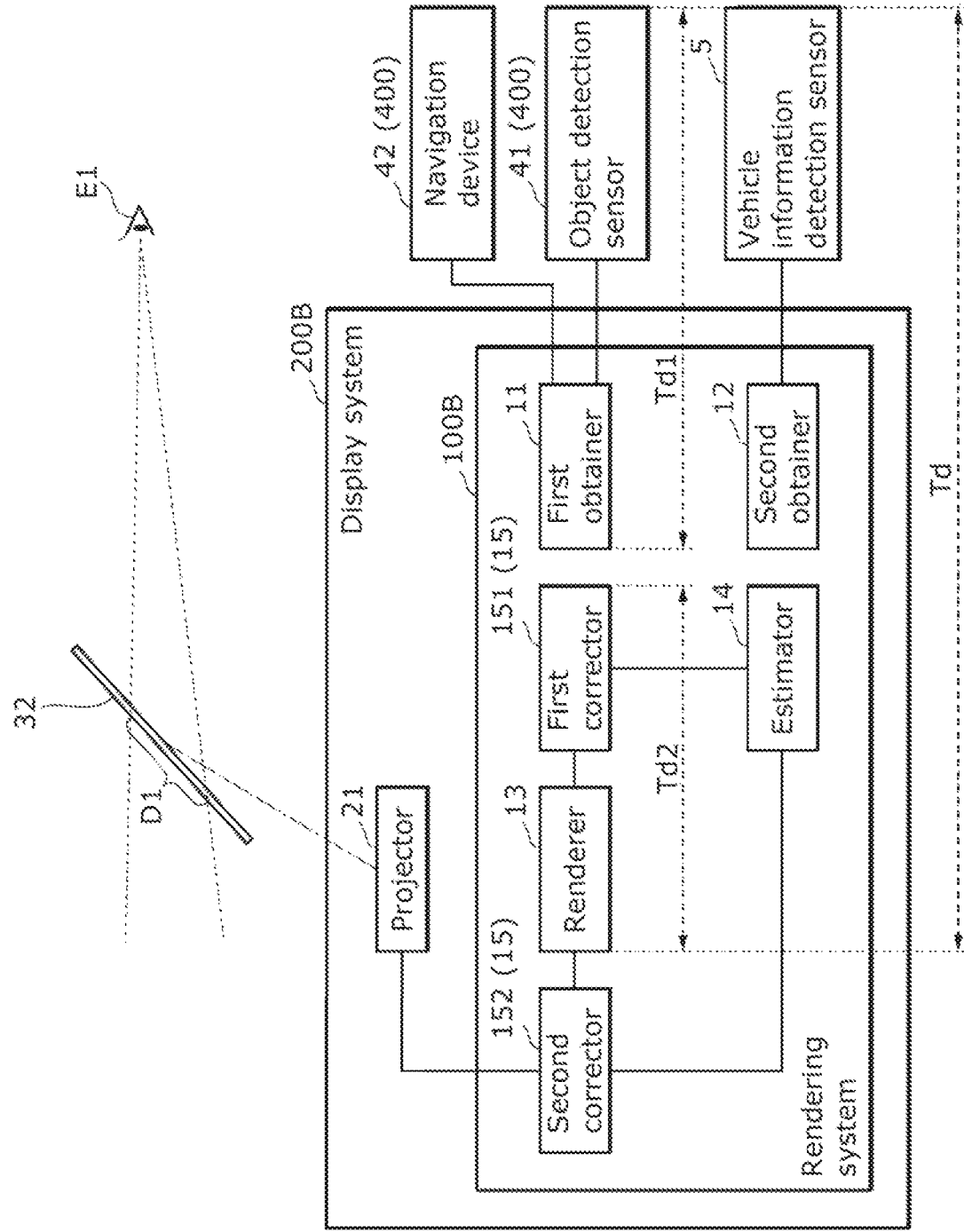
FIG. 11 is a block diagram illustrating an overview of a display system having a rendering system in variation 2.

FIG. 11 is a block diagram illustrating an overview of display system 200B having rendering system 100B in variation 2. As shown in FIG. 11, in variation 2, corrector 15 includes first corrector 151 located at the preceding stage of renderer 13 and second corrector 152 located at the post stage of renderer 13. That is, in variation 2, corrector 15 corrects the displacement of the display position of content 7 in display image 8 by using first corrector 151 before renderer 13 renders display image 8, and corrects the displacement of the display position of content 7 in display image 8 by using second corrector 152 after renderer 13 renders display image 8.

Consequently, in variation 2, delay period Td includes first delay period Td1 that is a delay from when detector 400 detects object 6 to when first obtainer 11 obtains the position information, and second delay period Td2 that is a delay from the end of first delay period Td1 to when renderer 13 renders display image 8. Before renderer 13 renders display image 8, first corrector 151 corrects displacement of the display position of content 7 in display image 8 which occurs over first delay period Td1. After renderer 13 renders display image 8, second corrector 152 corrects displacement of the display position of content 7 in display image 8 which occurs over second delay period Td2.

Here, first delay period Td1 is a delay period estimated by estimator 14, and second delay period Td2 is a known fixed value. If second delay period Td2 is not known, second delay period Td2 may be calculated by subtracting first delay period Td1 estimated by estimator 14 from delay period Td estimated by estimator 14. If second delay period Td2 is known, first delay period Td1 may be calculated by subtracting second delay period Td2 from delay period Td estimated by estimator 14.

Figure 12:
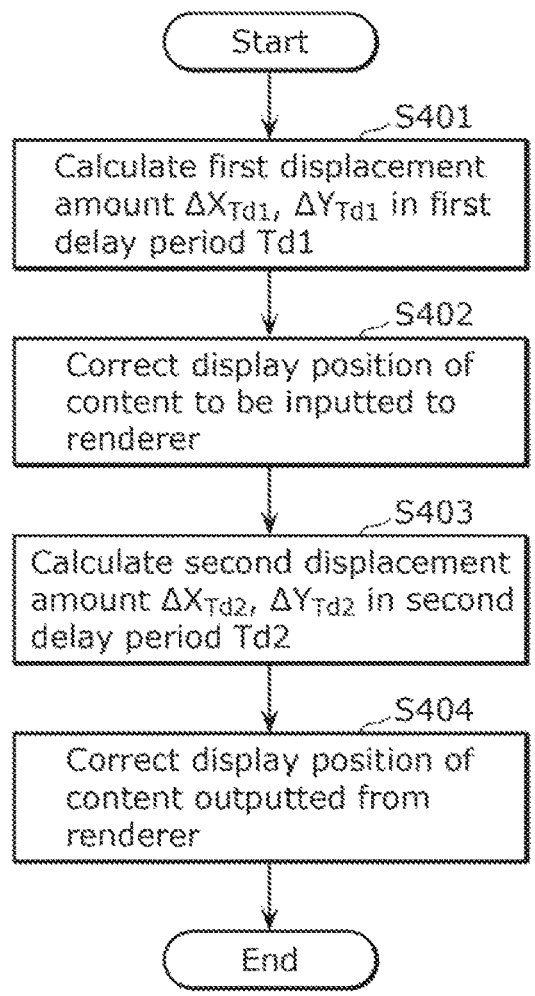
FIG. 12 is a flowchart illustrating exemplary operations of the rendering system in variation 2.

FIG. 12 is a flowchart illustrating exemplary operations of rendering system 100B in variation 2. First, first corrector 151 calculates first displacement amount $\Delta X_{Td1}$, $\Delta Y_{Td1}$, which is a relative displacement amount of object 6 with respect to vehicle 30 in first delay period Td1, based on movement information of vehicle 30 (moving body 300) obtained by second obtainer 12 (S401). Then, first corrector 151 corrects, in display image 8, displacement of a display position of content 7 to be inputted to renderer 13, using calculated first displacement amount $\Delta X_{Td1}$, $\Delta Y_{Td1}$ (S402). Renderer 13 renders display image 8 using coordinates of content 7 corrected by first corrector 151.

Next, second corrector 152 calculates second displacement amount $\Delta X_{Td2}$, $\Delta Y_{Td2}$, which is a relative displacement amount of object 6 with respect to vehicle 30 in second delay period Td2, based on movement information of vehicle 30 obtained by second obtainer 12 (S403). Then, second corrector 152 corrects, in display image 8, displacement of a display position of content 7 outputted from renderer 13, using calculated second displacement amount $\Delta X_{Td2}$, $\Delta Y_{Td2}$ (S404). Projector 21 projects, onto windowshield 32 (display medium), display image 8 rendered by rendering system 100b, that is, display image 8 for which second corrector 152 corrects the display position of content 7.

Furthermore, in variation 2, when data communication is performed between renderer 13 and second corrector 152, the image data rendered by renderer 13 may be transmitted to second corrector 152 in a state where position information on object 6, a time stamp, a region of content 7 in display image 8 or the like is embedded in the image data. In other words, in this variation, the data transmitted from renderer 13 to second corrector 152 may include information detected by detector 400. This variation advantageously facilitates synchronization between, for example, the position information on object 6 detected by detector 400 and display image 8 rendered by renderer 13.

Furthermore, in variation 2, second corrector 152 may correct displacement of a display position of content 7 in display image 8 by shifting content 7 that has already been rendered to a corrected display position in display image 8, not by re-rendering content 7. In other words, second corrector 152 may correct displacement of a display position of content 7 in display image 8 by shifting content 7 rendered by renderer 13. This variation can advantageously reduce the processing load on corrector 15 and also reduce a delay caused by processing in corrector 15, compared with a case in which the displacement of the display position of content 7 is corrected by re-rendering content 7.

When second corrector 152 shifts content 7 rendered by renderer 13, the following advantages are produced by correcting displacement of a display position of content 7 by first corrector 151 at the preceding stage of renderer 13.

Figure 13:
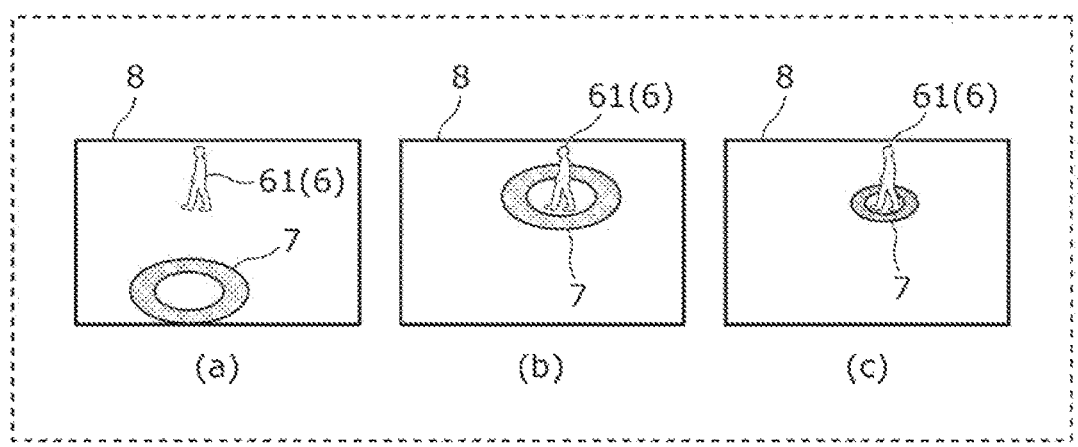
FIG. 13 is a diagram for explaining advantages of the rendering system in variation 2.

FIG. 13 is a diagram for explaining advantages of rendering system 100B in variation 2. (a) of FIG. 13 illustrates display image 8 when displacement of a display position of content 7 (here, a loop mark) with respect to object 6 (here, person 61) is not corrected. (b) of FIG. 13 illustrates display image 8 when second corrector 152 corrects the displacement of the display position of content 7. (c) of FIG. 13 illustrates display image 8 when first corrector 151 corrects a size of content 7 and then second corrector 152 corrects the displacement of the display position of content 7. In the examples shown in (a) to (c) of FIG. 13, person 61 is in an upper part of display image 8, in other words, far from vehicle 30. Therefore, in display image 8, person 61 is rendered relatively smaller in consideration of a depth.

When displacement of the display position of content 7 is corrected by second corrector 152 only as illustrated in (b) of FIG. 13, content 7 has already been rendered by renderer 13, and it is therefore impossible to change the size of content 7 to correspond to the size of person 6, which causes a problem that it is difficult for the occupant to recognize a distance of the virtual image. On the other hand, when displacement of the display position of content 7 is further corrected by first corrector 151 as illustrated in (c) of FIG. 13, renderer 13 can render content 7 relatively smaller to correspond to the size of person 61 based on displacement (coordinates of content 7) of the display position of content 7 corrected by first corrector 151, which allows the occupant to easily recognize the distance of the virtual image. In other words, by correcting displacement of the display position of content 7 by first corrector 151 at the preceding stage of renderer 13, it is possible to change a shape or size of content 7 to correspond to the display position of content 7 in display image 8.

Figure 14:
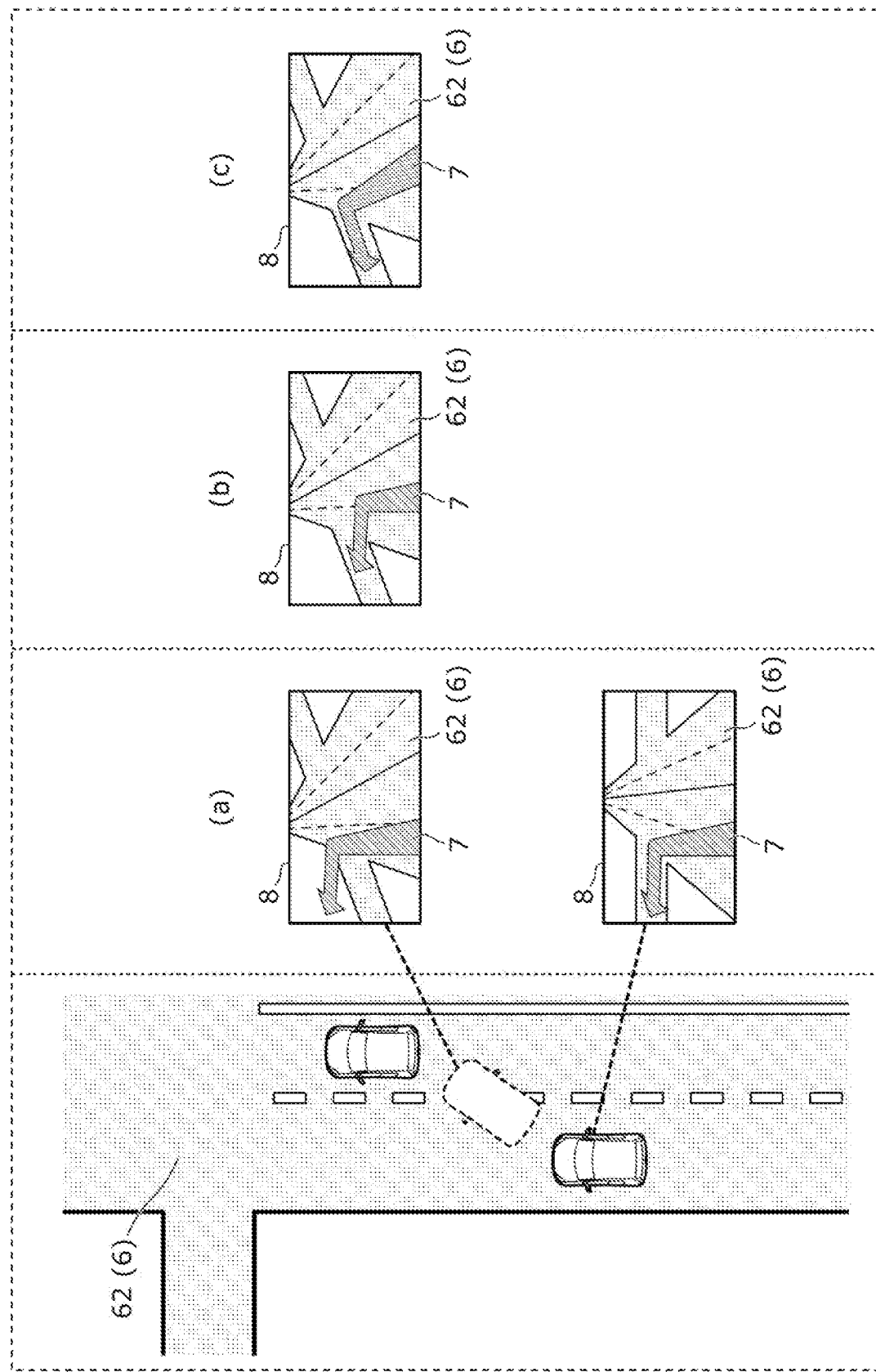
FIG. 14 is a diagram for explaining other advantages of the rendering system in variation 2.

FIG. 14 is a diagram for explaining other advantages of rendering system 100B in variation 2. (a) of FIG. 14 illustrates display image 8 when displacement of a display position of content 7 (here, an arrow indicating left turn) with respect to object 6 (here, intersection 62 ahead of vehicle 30) is not corrected. Lower display image 8 in (a) of FIG. 14 shows a case where vehicle 30 is running along the left lane, while upper display image 8 in (a) of FIG. 14 shows a case where vehicle 30 is temporarily moving from the left lane to the right lane. (b) of FIG. 14 illustrates display image 8 when second corrector 152 corrects the displacement of the display position of content 7. (c) of FIG. 14 illustrates display image 8 when first corrector 151 corrects the direction of content 7 and then second corrector 152 corrects the displacement of the display position of content 7.

As illustrated in (a) of FIG. 14, since displacement of the display position of content 7 is not corrected in upper display image 8, the arrow does not correctly point intersection 62 at which vehicle 30 should be turned left. On the other hand, as illustrated in (b) of FIG. 14, when displacement of the display position of content 7 is corrected by second corrector 152 only, the arrow correctly points intersection 62 at which vehicle 30 should be turned left, but the direction of the arrow is not along the road, which causes a problem that it is difficult for the occupant to recognize the indication of content 7.

On the other hand, as illustrated in (c) of FIG. 14, when displacement of the display position of content 7 is further corrected by first corrector 151, renderer 13 can render the direction of the arrow depending on the direction of the road based on displacement (coordinates of content 7) of the display position of content 7 corrected by first corrector 151, which allows the occupant to easily recognize the indication of content 7. In other words, by correcting displacement of the display position of content 7 by first corrector 151 at the preceding stage of renderer 13, it is possible to change the direction of content 7 depending on the display position of content 7 in display image 8.

It should be noted that first corrector 151 may correct only a shape or size of content 7 without correcting the display position of content 7 in display image 8. Since influence of delay to correction of a shape or size of content 7 is relatively small, first corrector 151 may correct a shape or size of content 7 using delay period Td instead of first delay period Td1. In this case, first corrector 151 calculates a relative displacement amount of object 6 with respect to vehicle 30 in delay period Td, and corrects only a shape or size of content 7 based on the calculated displacement amount. Furthermore, in this case, second corrector 152 calculates a relative displacement amount of object 6 with respect to vehicle 30 in delay period Td, and corrects displacement of display position of content 7 in display image 8 based on the calculated displacement amount. It should be noted that second corrector 152 may perform the correction based on the displacement amount calculated by first corrector 151. In this case, second corrector 152 does not need to calculate a displacement amount, thereby reducing the processing load.

Moreover, in variation 2, first corrector 151 may determine which of first corrector 151 and second corrector 152 is to correct displacement of a display position of content 7 in display image 8, based on a magnitude of a displacement amount of vehicle 30 (moving body 300). For example, when a displacement amount of vehicle 30 is small and an influence of the displacement amount to the displacement of the display position of content 7 is small, only the first corrector performs correction, thereby reducing the processing load of first corrector 15.

Figure 15:
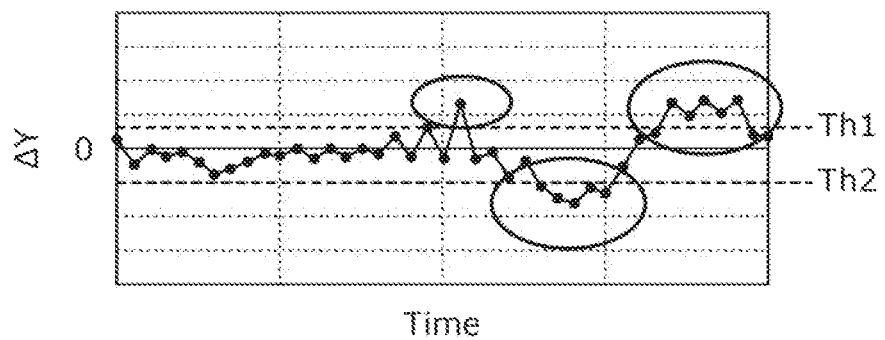
FIG. 15 is a diagram for explaining other exemplary operations of the rendering system in variation 2.

FIG. 15 illustrates exemplary operations of rendering system 100B in variation 2. In FIG. 15, a vertical axis indicates displacement amount ΔY in a Y-axis direction of vehicle 30, while a horizontal axis indicates a time. As illustrated in FIG. 15, when displacement amount ΔY is within a range between first threshold value Th1 and second threshold value Th2, corrector 15 uses only first corrector 151 to correct displacement of a display position of content 7 in display image 8. On the other hand, when displacement amount ΔY is beyond the above range as illustrated by encircled regions in FIG. 15, corrector 15 uses both first corrector 151 and second corrector 152 to correct displacement of the display position of content 7 in display image 8.

Furthermore, in variation 2, corrector 15 may determine which of first corrector 151 and second corrector 152 is to correct displacement of a display position of content 7 in display image 8, based on a magnitude of change per unit time (in other words, a difference in height of a varying frequency) in a displacement amount of vehicle 30 (moving body 300). For example, when change per unit time in a displacement amount of vehicle 30 is small and therefore the influence of the change to displacement of the display position of content 7 is small, only first corrector 151 performs correction, thereby reducing the processing load of corrector 15.

Figure 16:
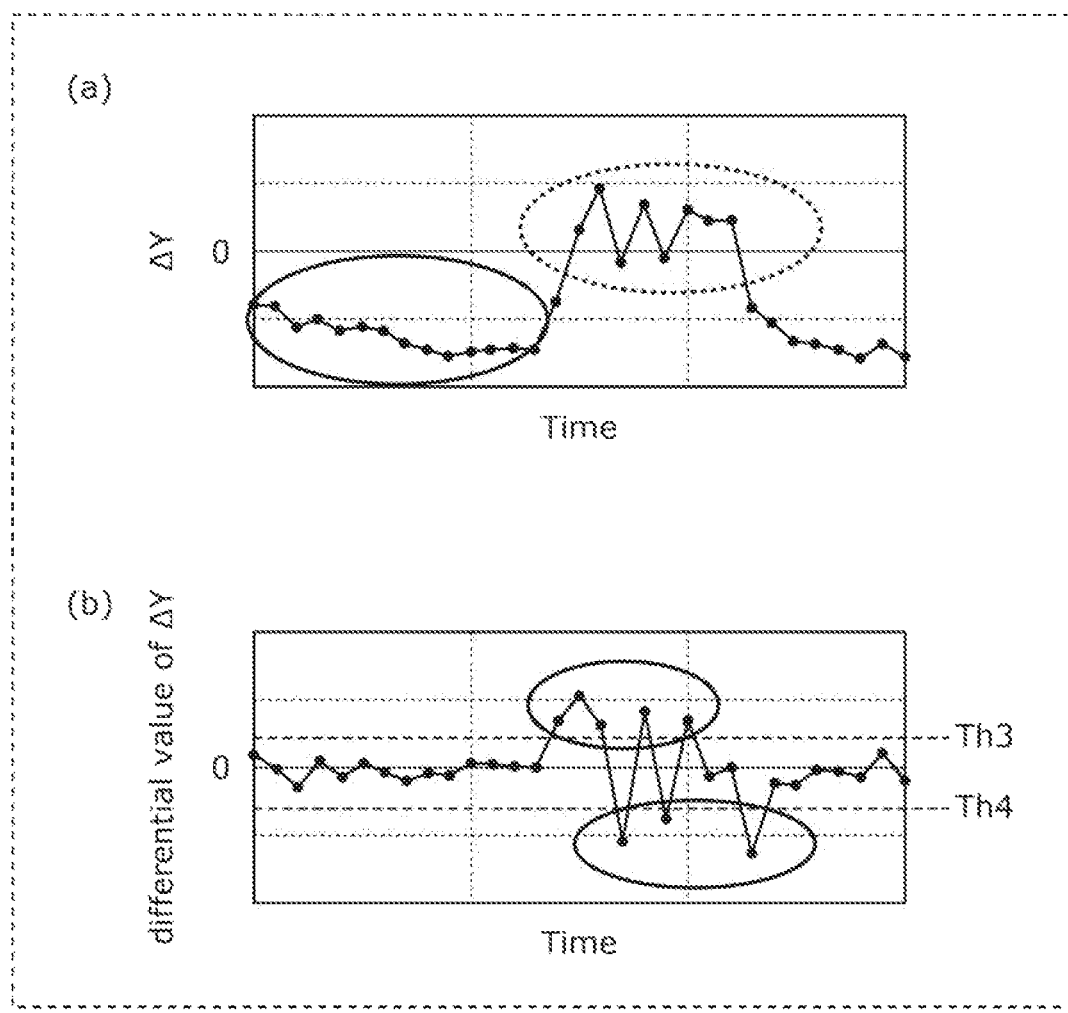
FIG. 16 is a diagram for explaining further exemplary operations of the rendering system in variation 2.

FIG. 16 illustrates other exemplary operations of rendering system 100B in variation 2. In (a) of FIG. 16, a vertical axis indicates displacement amount ΔY in a Y-axis direction of vehicle 30, while a horizontal axis indicates a time. Furthermore, in (b) of FIG. 16, a vertical axis indicates a differential value of displacement amount ΔY, in other words, change per unit time in displacement amount ΔY, while a horizontal axis indicates a time. In a region surrounded by a solid line in (a) of FIG. 16, a varying frequency is relatively low. On the other hand, in a region surrounded by a dotted line in (a) of FIG. 16, a varying frequency is relatively high. It is possible to calculate a differential value of displacement amount ΔY by, for example, executing differential processing on displacement amount ΔY or executing high-pass filtering on displacement amount ΔY.

As illustrated in (b) FIG. 16, when the differential value of displacement amount ΔY is within a range between third threshold value Th3 and fourth threshold value Th4, corrector 15 uses only first corrector 151 to correct displacement of a display position of content 7 in display image 8. On the other hand, when the differential value of displacement amount ΔY is beyond the above range as illustrated by encircled regions in (b) of FIG. 16, corrector 15 uses both first corrector 151 and second corrector 152 to correct displacement of the display position of content 7 in display image 8.

Moreover, first corrector 151 may determine which of first corrector 151 and second corrector 152 is to correct displacement of a display position of content 7 in display image 8, for each of displacement amount ΔX in an X-axis direction of vehicle 30 (moving body 300) and displacement amount ΔY in a Y-axis direction of vehicle 30. For example, corrector 15 performs correction using only first corrector 151 for displacement amount ΔX in the X-axis direction of vehicle 30 which is unlikely to receive influence of delay, while corrector 15 performs correction using only second corrector 152 for displacement amount ΔY in the Y-axis direction of vehicle 30 which is likely to receive influence of delay.

<Variation 3>

Figure 17:
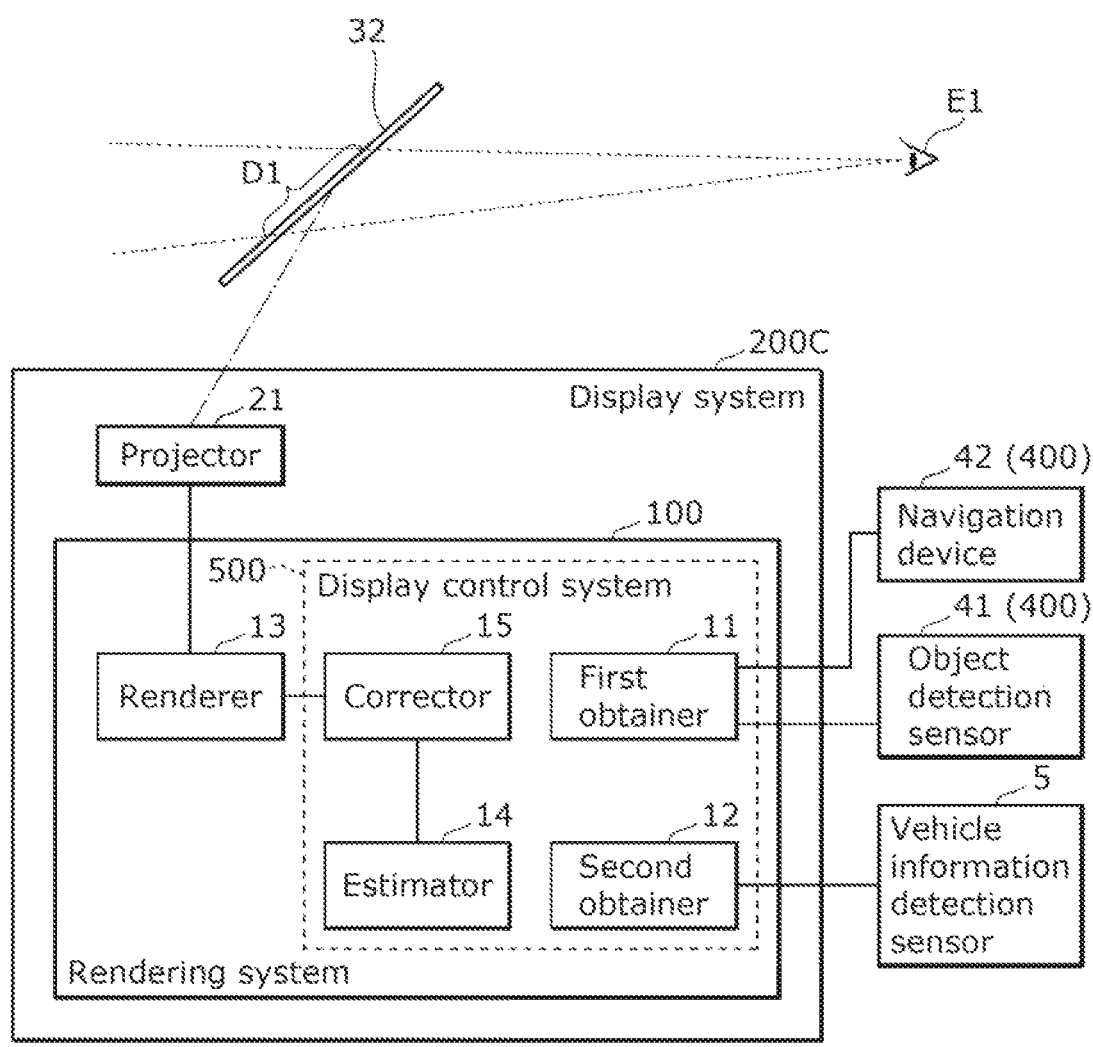
FIG. 17 is a block diagram illustrating an overview of a display system having a display control system in variation 3.

FIG. 17 is a block diagram illustrating an overview of display system 200C having display control system 500 in variation 3. As shown in FIG. 17, in variation 3, in display system 200C, renderer system 100 includes renderer 13 and display control system 500. Display control system 500 includes first obtainer 11, second obtainer 12, estimator 14, and corrector 15, and does not include renderer 13.

Figure 18:
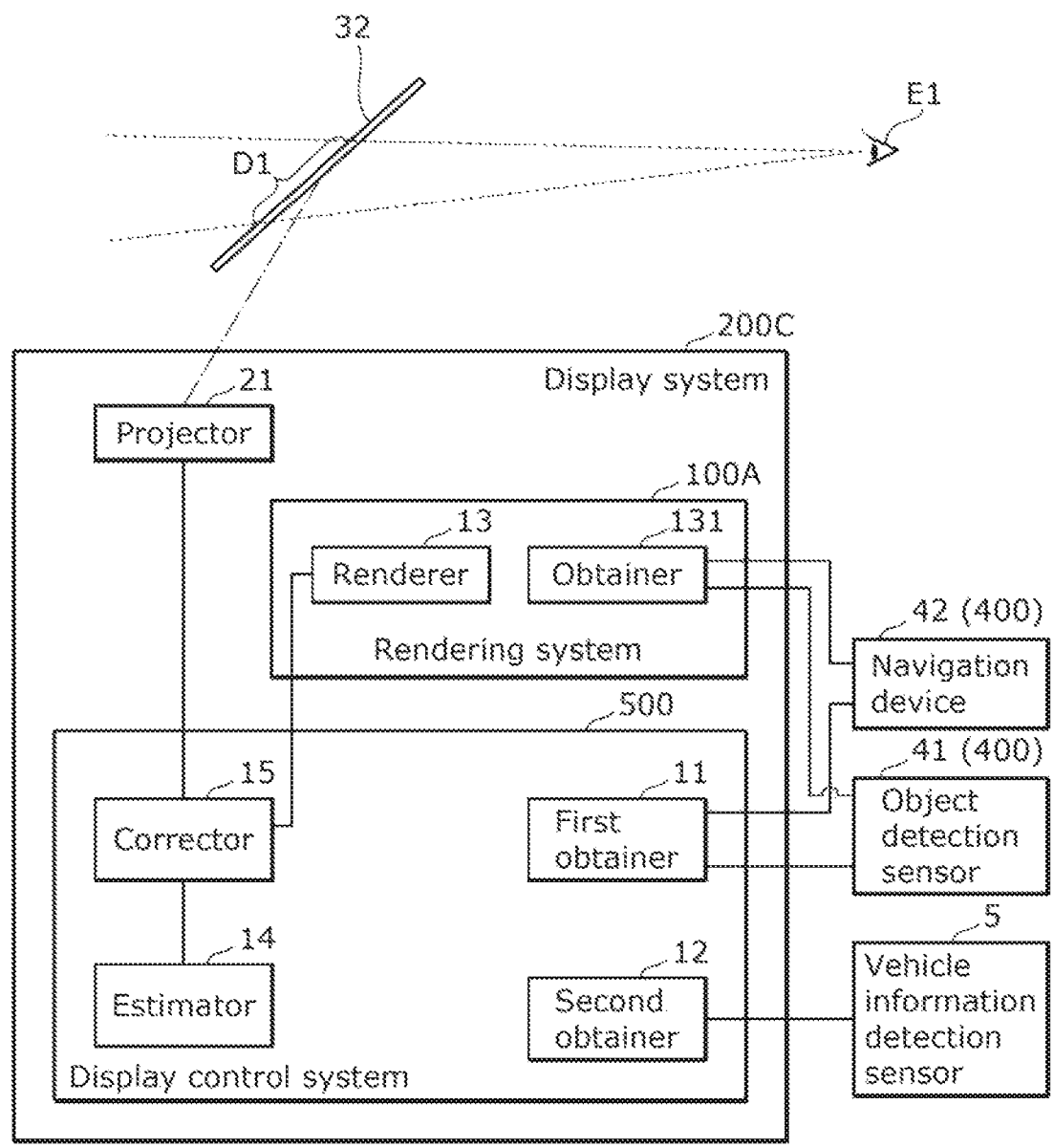
FIG. 18 is a block diagram illustrating an overview of another example of the display system having the display control system in variation 3.

Although the example of FIG. 17 illustrates that renderer 13 is positioned at the post stage of corrector 15 and that rendering system 100 includes display control system 500, variation 3 is not limited to this configuration. FIG. 18 is a block diagram illustrating an overview of another example of display system 200C having display control system 500 in variation 3. As illustrated in FIG. 18, it is possible that rendering system 100A including renderer 13 and obtainer 131 is separate from display control system 500, and that corrector 15 is positioned at the post stage of renderer 13. In other words, the example of FIG. 18 illustrates that corrector 15 corrects displacement of a display position of content 7 in display image 8 after renderer 13 renders display image 8.

It should be noted that obtainer 131 has functions equivalent to the functions of first obtainer 11 and second obtainer 12. In other words, obtainer 131 obtains position information from detector 400 and obtains second information from vehicle information detection sensor 5. Therefore, renderer 13 renders display image 8 based on the position information and the movement information which are obtained by obtainer 131.

Furthermore, in variation 3, when data communication is performed between renderer 13 and corrector 15, the image data rendered by renderer 13 may be transmitted to corrector 15 in a state where position information on object 6, a time stamp, a region of content 7 in display image 8 or the like is embedded in the image data. In other words, in this variation, the data transmitted from renderer 13 to corrector 15 may include information detected by detector 400. This variation advantageously facilitates synchronization between, for example, the position information on object 6 detected by detector 400 and display image 8 rendered by renderer 13.

<Variation 4>

Figure 19:
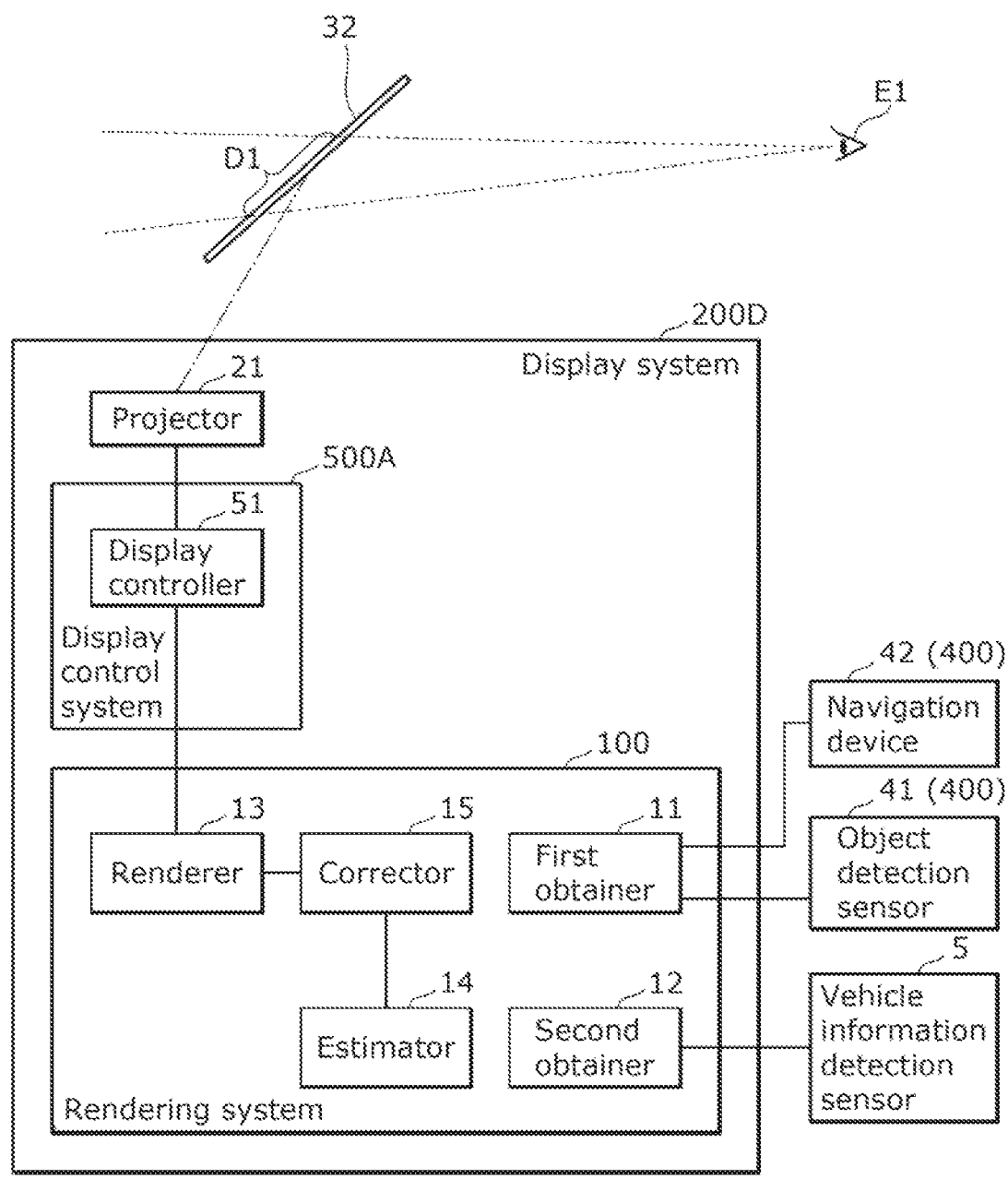
FIG. 19 is a block diagram illustrating an overview of a display system having a display control system in variation 4.

FIG. 19 is a block diagram illustrating an overview of display system 200D having display control system 500A in variation 4. As shown in FIG. 19, in variation 4, display system 200D includes display control system 500A between renderer 13 and projector 12, and display control system 500A includes display controller 51 that controls displaying of display image 8.

Display image 8 is rendered based on (i) position information that indicates a position of object 6 in the vicinity of vehicle 30 (moving body 300) and is obtained by detector 400 for detecting object 6 and (ii) moving information that indicates a movement state of vehicle 30. Then, display image 8 is projected onto windowshield 32 (display medium) to allow the occupant of vehicle 30 to view display image 8 as a virtual image. Display image 8 includes content 7 related to object 6. In other words, display image 8 is an image outputted from rendering system 100.

Display controller 51 controls displaying of display image 8 to cause display image 8 that has been corrected to be projected on windowshield 32 (display medium). Display image 8 that has been corrected is generated by correcting displacement of a display position of the content in display image 8 which is caused by movement of vehicle 30 over delay period Td. Delay period Td is a period including a delay from when detector 1 detects object 6 to when the position information is obtained. The delay is estimated by comparing the position information to estimated-position information indicating an estimated position of object 6 which is estimated based on movement information on vehicle 30 (moving body 300).

<Other Variations>

In the above embodiment 1, the delay period Td may be updated, for example each time the position information is obtained from detector 400. In this process, a disturbance may prevent correct estimating of the delay period Td. A disturbance may occur when, for example, vehicle 30 (moving body 300) behaves in an unusual manner or when the operation of detector 400 is unstable. To address this, in estimating the delay period Td, estimator 14 may execute disturbance cancellation for cancelling a disturbance that affects the delay period Td. Because estimator 14 cancels a disturbance in estimating the delay period Td, this aspect advantageously facilitates improving the accuracy of estimating the delay period Td. The following are examples of the disturbance cancellation.

As an example, the disturbance cancellation is processing in which the delay period Td is set to the average of delay periods calculated in estimating the delay period Td. Specifically, as shown in FIG. 6, estimator 14 calculates the provisional delay period Tdb satisfying the condition and updates the delay period Td to the calculated provisional delay period Tdb. Here, estimator 14 performs multiple times of calculation of the provisional delay period Tdb satisfying the condition and sets the delay period Td to the average of the calculated values of the provisional delay period Tdb. Compared with a case in which the delay period Td is set to the calculated delay period (the provisional delay period Tdb satisfying the condition) each time it is calculated, this aspect advantageously facilitates canceling a disturbance affecting the delay period Td. The average may be, for example, the average of all values of the provisional delay period Tdb calculated previously, or may be the average of a predetermined number of values of the provisional delay period Tdb up to the latest value calculated. The current average may be maintained until the predetermined number of values of the provisional delay period Tdb are calculated, and may be updated upon calculation of the predetermined number of values.

As another example, the disturbance cancellation is processing in which the result of estimating the delay period Td is excluded during a time period in which the interval between the first time stamps indicating the time points of detection of object 6 by detector 400 (i.e., the detection cycle Ts) is outside a predetermined range. That is, an unusual detection cycle Ts may suggest that detector 400 is unstable, and therefore the delay period Td is not updated during such an unstable period. This aspect advantageously facilitates cancelling a disturbance affecting the delay period Td by excluding the result of estimating the delay period Td during a time period in which detector 400 is considered unstable.

As another example, the disturbance cancellation is processing in which the result of estimating the delay period Td is excluded during a time period in which the displacement amount in the orientation of vehicle 30 (moving body 300) is smaller than a predetermined value. That is, if the displacement amount in the orientation (e.g., the displacement amount in the position along the X-axis) of vehicle 30 is relatively small, for example when vehicle 30 is running on a straight road, estimator 14 may fail to accurately calculate the displacement amount in the position of vehicle 30 over a predetermined time period, resulting in a reduced accuracy of estimating the delay period Td. This aspect advantageously facilitates cancelling a disturbance affecting the delay period Td by excluding the result of estimating the delay period Td during such a time period with a relatively small displacement amount in the orientation of vehicle 30.

As another example, the disturbance cancellation is processing in which the result of estimating the delay period Td is excluded during a time period in which the magnitude of vibrations of vehicle 30 (moving body 300) is greater than a predetermined magnitude. That is, if the magnitude of vibrations of vehicle 30 is greater than a predetermined value, for example when vehicle 30 is running on a bad road or running erratically, estimator 14 may fail to correctly calculate the displacement amount in the position of vehicle 30 over a predetermined time period, resulting in a reduced accuracy of estimating the delay period Td. This aspect advantageously facilitates cancelling a disturbance affecting the delay period Td by excluding the result of estimating the delay period Td during such a time period with a relatively great magnitude of vibrations of vehicle 30.

There may be multiple detectors 400 as in above embodiments 1 and 2 (in which two devices including object detection sensor 41 and navigation device 42 are detectors 400). In such cases, the delay period Td may be a different value for each detector 400. That is, estimator 14 may estimate the delay period Td for each of multiple detectors 400. Compared with a case in which a single delay period Td is shared by multiple detectors 400, this aspect advantageously facilitates improving the accuracy of correcting the displacement of the display position of content 7 in display image 8.

If detector 400 detects multiple objects 6 in above embodiments 1 and 2, estimator 14 may focus on any one of objects 6 to estimate the delay period Td. To facilitate the estimating of the delay period Td, focus object 6 may be, for example, an object having a small displacement amount in the position per unit time, or an object closest to the center of the image captured by the camera serving as object detection sensor 41.

The configuration of projector 21 or the display scheme in embodiments 1 and 2 are not limited to those described above but may be modified according to any existing HUD technique. For example, projector 21 may be a laser projector or a liquid crystal on silicon (LCOS) projector instead of the LCD projector, or may include lenses instead of the mirrors. Projector 21 may include any number of mirrors. Further, the concave mirror in projector 21 may be motor-driven so that its angle is adjusted to the height of the driver's viewpoint E1.

Although projector 21 in the above embodiments projects images onto windshield 32, projector 21 may project images onto a combiner, which is a semitransparent mirror provided separate from windshield 32. Projector 21 may also be configured to display images on a transmissive display provided in or on windshield 32.

The order of performing the steps of the above display control processing in rendering system 100 is not necessarily limited to the order described above. Rather, the steps may be reordered or some steps may be eliminated without departing from the spirit of the present disclosure. All or some of the steps of the above display control processing may be implemented in either hardware or software. Software-based processing is implemented in such a manner that a processor in an apparatus such as a computer executes a control program for the display control processing stored in memory. The control program may be recorded on a recording medium to be distributed or transported. For example, the distributed control program may be installed in an apparatus having a processor and executed by the processor to cause the apparatus to perform all or part of the display control processing.

The computer in above rendering system 100 may, although not necessarily, include an input device such as a touch pad, an output device such as a display or a speaker, a storage device such as a hard disk device or a solid state drive (SSD), a reading device for reading information from recording media such as digital versatile disc read only memory (DVD-ROM) discs or universal serial bus (USB) memory devices, or a transceiver for communication over a network. For example, if the above control program is recorded on a recording medium such as a USB memory device, the reading device reads the control program from the USB memory device and stores it in memory or other storage. Alternatively, the transceiver may communicate over a network with an external server device storing the control program and download the control program from the server device, and may store the control program in memory or other storage. Rendering system 100 may also be configured as an integrated circuit.

Implementations achieved by any combination of the above components and functions are within the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims are incorporated herein by reference in its entirety: Japanese Patent Application No. 2021-056318 filed on Mar. 29, 2021 and Japanese Patent Application No. 2022-044651 filed on Mar. 18, 2022.

INDUSTRIAL APPLICABILITY

The present disclosure is applicable to systems such as rendering systems for rendering a display image that is projected onto a display medium to be viewed as a virtual image by an occupant of a moving body.

The invention claimed is:

1. A rendering system, comprising:
a processor; and
a memory including at least one set of instructions that, when executed by the processor, causes the processor to perform operations, the operations including:
obtaining, from a sensor that detects an object in a vicinity of a moving body, position information indicating a position of the object;
obtaining movement information indicating a movement state of the moving body;
rendering a display image including a content related to the object based on the position information and the movement information, the display image being projected on a display medium to be viewed as a virtual image by an occupant of the moving body;
estimating a delay period including a delay by comparing the position information to estimated-position information, the delay being a time period from when the object is detected to when the position information is obtained, the estimated-position information indicating an estimated position of the object which is estimated based on the movement information of the object; and
correcting a displacement of a display position of the content included in the display image, the displacement being caused by movement of the moving body over the delay period, wherein
the processor:
calculates the estimated-position information by adding a displacement amount to a position of the object relative to the moving body over a predetermined period to the position information obtained at a first time, the displacement amount being calculated based on the movement information, and
estimates the delay period by comparing the position information obtained at a second time, when the predetermined period has elapsed from the first time, with the estimated-position information.

2. The rendering system according to claim 1, wherein the processor estimates the delay period with reference to a first time stamp and a second time stamp, the first time stamp indicating at least a time period counted by the sensor, the second time stamp indicating at least a time period counted by the rendering system.

3. The rendering system according to claim 1, wherein in the estimating of the delay period, the processor executes disturbance cancellation for cancelling disturbance that influences the delay period.

4. The rendering system according to claim 3, wherein the disturbance cancellation is processing in which an average value of provisional delay periods calculated for the estimating of the delay period is set to the delay period.

5. The rendering system according to claim 3, wherein the disturbance cancellation is processing in which a result of the estimating is excluded from the delay period, the estimating being executed in a time period where an interval between first time stamps each indicating a time point of detecting the object by the sensor is beyond a predetermined range.

6. The rendering system according to claim 3, wherein the disturbance cancellation is processing in which a result of the estimating is excluded from the delay period, the estimating being executed in a time period where a displacement amount in an orientation of the moving body is smaller than a predetermined value.

7. The rendering system according to claim 3, wherein the disturbance cancellation is processing in which a result of the estimating is excluded from the delay period, the estimating being executed in a time period where a magnitude of vibration of the moving body is greater than a predetermined magnitude.

8. The rendering system according to claim 1, wherein the processor corrects the displacement of the display position of the content on the display image after the rendering of the display image.

9. The rendering system according to claim 8, wherein data transmitted from an operation of rendering the display image to an operation of correcting the displacement includes information resulting from detection by the sensor.

10. The rendering system according to claim 8, wherein the processor corrects the displacement of the display position of the content on the display image, by shifting the content rendered.

11. The rendering system according to claim 1, wherein the delay period includes a first delay period and a second delay period, the first delay period being from when the sensor detects the object to when the processor obtains the position information, the second delay period being from an end of the first period to when the processor renders the display image,
the correcting includes:
a first correcting that corrects, prior to the rendering of the display image, the displacement of the display position of the content in the display image which occurs over the first delay period; and
a second correcting that corrects, after the rendering of the display image, the displacement of the display position of the content in the display image which occurs over the second delay period.

12. The rendering system according to claim 11, wherein data transmitted from an operation of rendering the display image to the second correcting includes information detected by the sensor.

13. The rendering system according to claim 11, wherein the second correcting corrects the displacement of the display position of the content in the display image by shifting the content rendered.

14. The rendering system according to claim 11, wherein the processor determines, based on a magnitude of a displacement amount of the moving body, which of the first correcting and the second correcting is to correct the displacement of the display position of the content in the display image.

15. The rendering system according to claim 11, wherein the processor determines, based on a magnitude of change per unit time in the displacement amount of the moving body, which of the first correcting and the second correcting is to correct the displacement of the display position of the content in the display image.

16. The rendering system according to claim 1, further comprising:
a plurality of sensors, each being the sensor, wherein the processor estimates the delay period for each of the plurality of sensors.

17. A display system, comprising:
the rendering system according to claim 1; and
a projector that projects the display image onto the display medium to be viewed as the virtual image by the occupant of the moving body, the display image being rendered by the rendering system.

18. A display control system, comprising:

a processor; and a memory including at least one set of instructions that, when executed by the processor, causes the processor to perform operations, the operations including:

obtaining, from a sensor that detects an object in a vicinity of a moving body, position information indicating a position of the object;

obtaining movement information indicating a movement state of the moving body;

estimating a delay period including a delay from when the object is detected to when the position information is obtained, by comparing the position information to estimated-position information indicating an estimated position of the object which is estimated based on movement information of the moving body;

correcting a displacement of a display position of a content on a display image, the displacement being caused by movement of the moving body over the delay period, wherein the display image is projected on a display medium to allow an occupant of the moving body to view the display image as a virtual image, the display image being projected based on the position information and the movement information, the display image includes the content related to the object, and the processor:

calculates the estimated-position information by adding a displacement amount to a position of the object relative to the moving body over a predetermined period to the position information obtained at a first time, the displacement amount being calculated based on the movement information, and estimates the delay period by comparing the position information obtained at a second time, when the predetermined period has elapsed from the first time, with the estimated-position information.

19. A display control system, comprising a processor; and a memory including at least one set of instructions that, when executed by the processor, causes the processor to perform operations, the operations including:

controlling displaying of a display image, the display image being rendered based on: (i) position information that indicates a position of an object in a vicinity of a moving body, the position information being obtained by a sensor for detecting the object; and (ii) moving information that indicates a movement state of the moving body, the display image being projected onto a display medium to allow an occupant of the moving body to view the display image as a virtual image, the display image including a content related to the object, wherein the processor controls the displaying of the display image to cause a corrected display image to be projected on the display medium, the corrected display image is the display image in which a displacement of a display position of the content is corrected, the displacement being caused by movement of the moving body over a delay period, the delay period includes a delay from when the sensor detects the object to when the position information is obtained, the delay being estimated by comparing the position information to estimated-position information indicating an estimated position of the object which is estimated based on movement information of the moving body, and the processor calculates the estimated-position information by adding a displacement amount in a position of the object relative to the moving body over a predetermined period to the position information obtained at a first time, the displacement amount being calculated based on the movement information, and estimates the delay period by comparing the position information obtained at a second time, when the predetermined period has elapsed from the first time, with the estimated-position information.

20. A rendering method, comprising:

obtaining, from a sensor that detects an object in a vicinity of a moving body, position information indicating a position of the object;

obtaining movement information indicating a movement state of the moving body;

rendering a display image including a content related to the object based on the position information and the movement information, the display image being projected on a display medium to be viewed as a virtual image by an occupant of the moving body;

calculating estimated-position information by adding a displacement amount in a position of the object relative to the moving body over a predetermined period to the position information obtained at a first time, the estimated-position information indicating an estimated position of the object which indicates an estimated position of the object which is estimated based on the moving information of the object, the displacement amount being calculated based on the movement information, estimating a delay period including a delay by comparing the position information obtained at a second time, when the predetermined period has elapsed from the first time, to the estimated-position information, the delay being a time period from the detecting of the object to the obtaining of the position information; and correcting a displacement of a display position of the content on the display image, the displacement being caused by movement of the moving body over the delay period.

\* \* \* \* \*